(12) United States Patent
Milam et al.

(10) Patent No.: US 9,697,804 B2
(45) Date of Patent: *Jul. 4, 2017

(54) PRESENTING DATA IN A GRAPHICAL OVERLAY

(71) Applicant: INTERNATIONAL BUSINESS MACHINES CORPORATION, Armonk, NY (US)

(72) Inventors: Jennifer L. Milam, Austin, TX (US); Eric W. Leong, Austin, TX (US); Pamela A. Nesbitt, Austin, TX (US); Jonathan W. Stoecker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,915

(22) Filed: May 26, 2016

(65) Prior Publication Data
US 2016/0275918 A1    Sep. 22, 2016

Related U.S. Application Data

(63) Continuation of application No. 14/015,864, filed on Aug. 30, 2013, now Pat. No. 9,430,990.

(51) Int. Cl.
*G09G 5/00*    (2006.01)
*G09G 5/377*    (2006.01)
(Continued)

(52) U.S. Cl.
CPC ............. *G09G 5/377* (2013.01); *G01C 21/32* (2013.01); *G06F 3/048* (2013.01);
(Continued)

(58) Field of Classification Search
None
See application file for complete search history.

(56) References Cited

U.S. PATENT DOCUMENTS

| 7,966,125 B2 | 6/2011 | Wipplinger et al. |
| 8,635,547 B2 * | 1/2014 | Otsuka .................. G06F 3/0482 715/768 |

(Continued)

FOREIGN PATENT DOCUMENTS

| CN | 102084352 | 6/2011 |
| CN | 102236690 | 11/2011 |

OTHER PUBLICATIONS

Stone et al., "The Movable Filter as a User Interface Tool", 1994, URL: http://delivery.acm.org/10.1145/200000/191774/p306-stone.pdf?ip=151.207.250.61&id=191774&acc=ACTIVE%20SERVICE&key=C15944E53D0ACA63%2E4D4702B0C3E38B35%2E4D4702B0C3E38B35%2E4D4702B0C3E38B35&CFID=656714912&CFTOKEN=85766059&_acm_=1471455134_310848ddf1ba82bbab4adb757b0f3fdc.*

(Continued)

*Primary Examiner* — David H Chu
(74) *Attorney, Agent, or Firm* — Gates & Cooper LLP

(57) ABSTRACT

A system and computer program product for displaying data in a graphical overlay. The system overlays a first lens, including a first dataset, on a first region of the graphical overlay while a second lens, including a second dataset, overlaps the first lens. The first and second datasets are simultaneously displayed, and a correlation between the datasets is determined. Separation of the first and second lenses preserves a circumscribed region within each lens. The first dataset corresponds to first orientation position of the first lens. Rotation of the first lens to a second orientation position reconfigures the first dataset to provide a modified first dataset which corresponds to the second position. A rotational position may also be associated with points in time, a first position corresponding to a first point in time and (Continued)

the first dataset representing the first dataset at the first point in time.

16 Claims, 16 Drawing Sheets

(51) Int. Cl.
| | |
|---|---|
| *G09G 5/14* | (2006.01) |
| *G01C 21/32* | (2006.01) |
| *G06F 3/048* | (2013.01) |
| *G06T 11/00* | (2006.01) |
| *G06F 3/0481* | (2013.01) |
| *G06F 3/0484* | (2013.01) |
| *G06T 3/60* | (2006.01) |
| *G06T 11/20* | (2006.01) |
| *G09B 5/02* | (2006.01) |
| *G09B 29/00* | (2006.01) |
| *G06T 3/20* | (2006.01) |
| *G09B 29/10* | (2006.01) |
| *G09G 5/38* | (2006.01) |

(52) U.S. Cl.
CPC ...... *G06F 3/04817* (2013.01); *G06F 3/04842* (2013.01); *G06F 3/04845* (2013.01); *G06T 3/20* (2013.01); *G06T 3/60* (2013.01); *G06T 11/00* (2013.01); *G06T 11/206* (2013.01); *G09B 5/02* (2013.01); *G09B 29/005* (2013.01); *G09B 29/106* (2013.01); *G09G 5/14* (2013.01); *G06F 2203/04804* (2013.01); *G09G 5/38* (2013.01); *G09G 2340/045* (2013.01); *G09G 2340/10* (2013.01); *G09G 2340/12* (2013.01)

(56) References Cited

U.S. PATENT DOCUMENTS

| | | | |
|---|---|---|---|
| 2002/0130896 A1* | 9/2002 | Spence | G09G 5/00 715/716 |
| 2004/0030492 A1 | 2/2004 | Fox et al. | |
| 2004/0064450 A1 | 4/2004 | Hatano et al. | |
| 2006/0059437 A1* | 3/2006 | Conklin, III | G06F 3/0481 715/800 |
| 2008/0291217 A1 | 11/2008 | Vincent et al. | |
| 2009/0327078 A1* | 12/2009 | Ohazama | G01C 21/3682 705/14.54 |
| 2010/0275122 A1* | 10/2010 | Buxton | G06F 3/0488 715/728 |
| 2013/0090842 A1 | 4/2013 | Stabile | |
| 2013/0147834 A1* | 6/2013 | Yoshimoto | G01C 21/367 345/629 |

OTHER PUBLICATIONS

Chu, David H., Non-Final Office Action, U.S. Appl. No. 15/165,952, The United States Patent and Trademark Office, Aug. 26, 2016.

Stone, et al., "Toolglass and magic lenses: the see-through interface", ACM, URL: http://dl.acm.org/citation.cfm?d=166126.

* cited by examiner

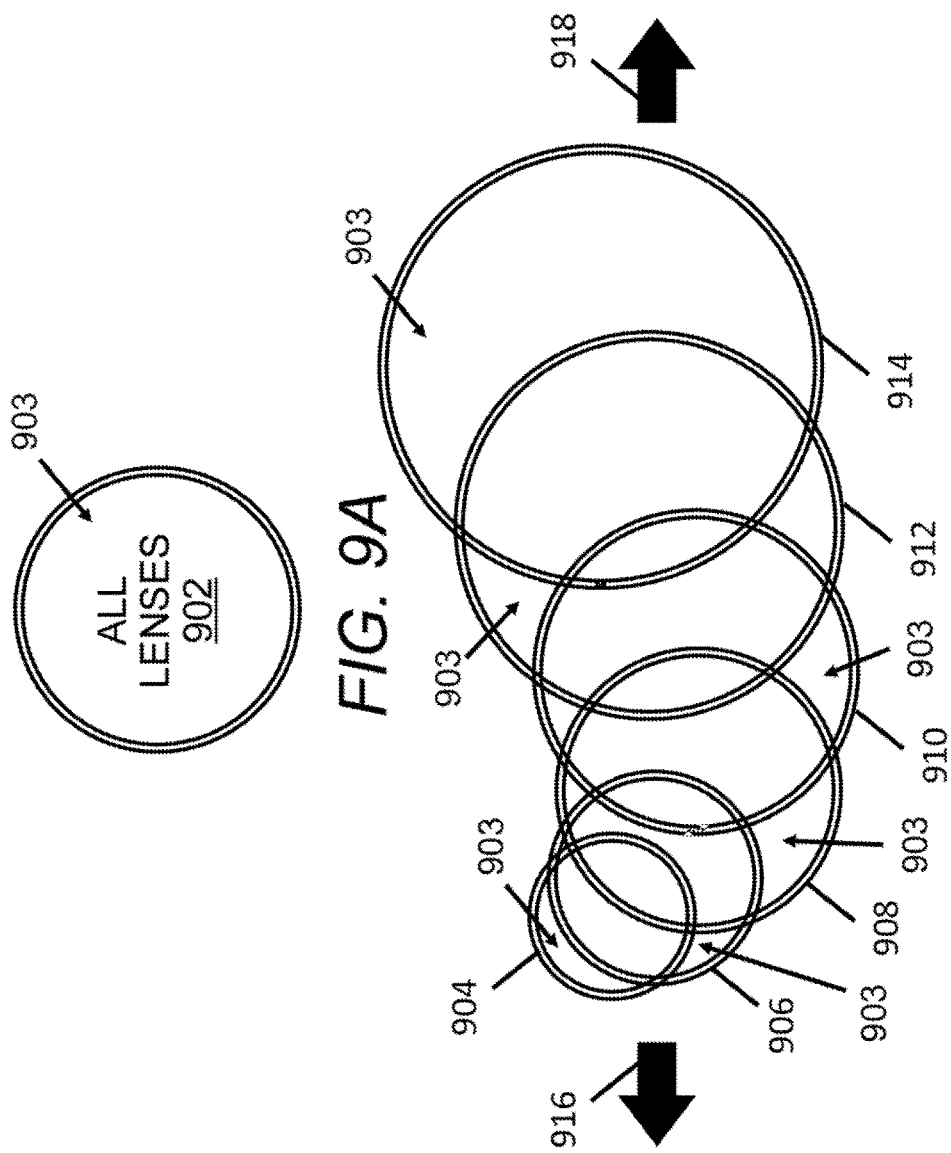

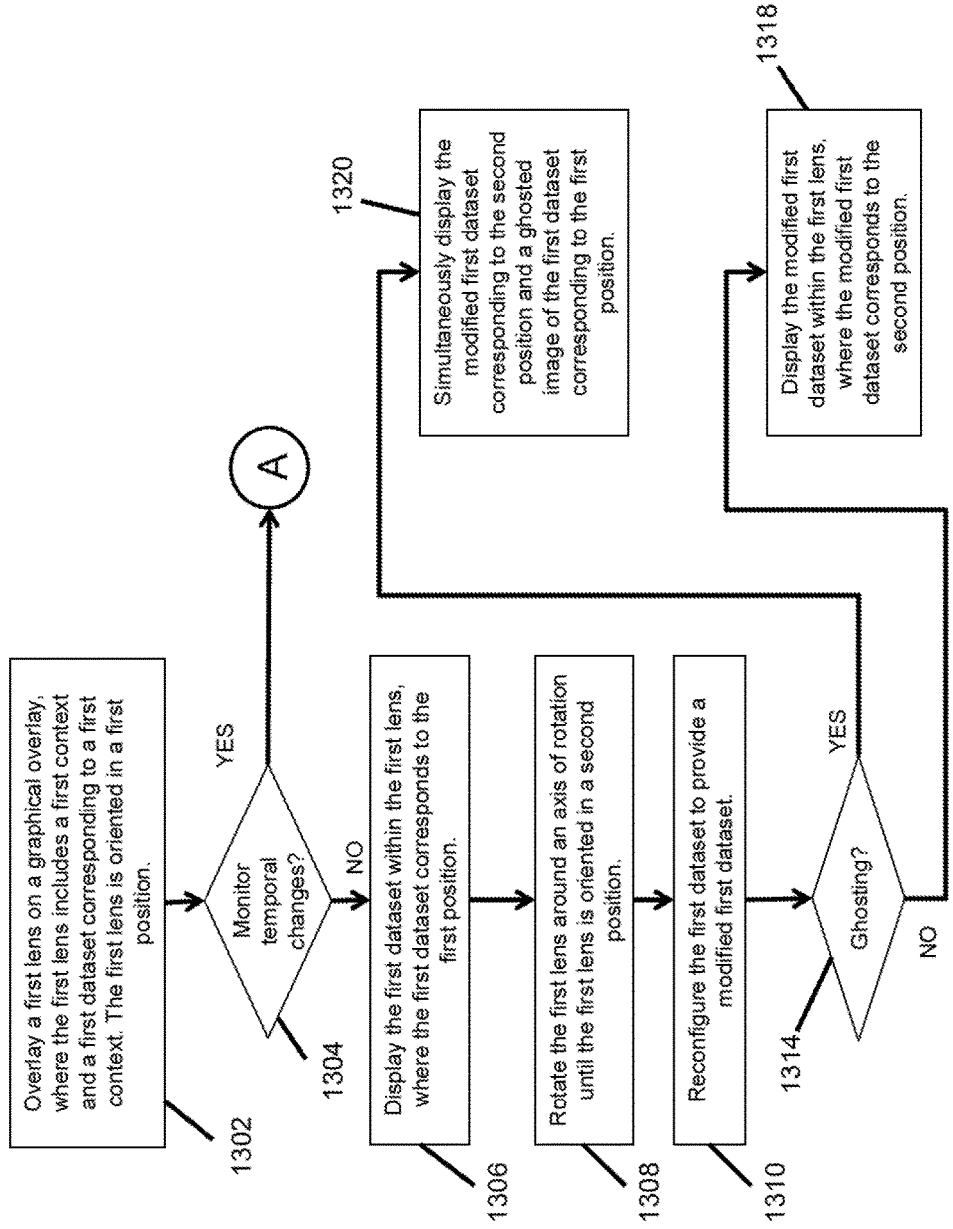

PRESENTING DATA IN A GRAPHICAL OVERLAY

PRIORITY CLAIM

The present application is a continuation of U.S. patent application Ser. No. 14/015,864, titled "PRESENTING A DATA IN A GRAPHICAL OVERLAY," filed on Aug. 30, 2013, the contents of which is incorporated herein by reference in its entirety.

CROSS REFERENCE TO RELATED APPLICATIONS

The present disclosure is related to the subject matter of commonly assigned, co-pending application Ser. No. 14/472,676 filed on Aug. 29, 2014, co-pending application Ser. No. 14/015,856, filed on Aug. 30, 2013, and co-pending application Ser. No. 15/165,952, filed on even date herewith.

BACKGROUND

1. Technical Field

The present disclosure generally relates to computer systems and in particular to computer-implemented methods of presenting data in a graphical overlay.

2. Description of the Related Art

The management and operation of cities and/or enterprises is a challenging task, particularly with the ever-increasing size and number of entities within them. In order to make well-informed decisions regarding city and/or enterprise operations, relationships between and among entities, such as buildings, equipment, etc., and related information such as maintenance history and schedules, must be available and understood. The modeling of complex relationships among such entities is challenging and becomes more difficult as the complexities of cities/enterprises increase. Semantic models have been used to model the relationships among city/enterprise entities, and specifically have been used to describe linkages between and among different sets of data across various entities. However, in order to learn anything about the relationships and associations defined by a semantic model, a user must construct a set of fairly complex queries (e.g., structured query language (SQL) queries) in order to retrieve desired relational information about the entities. Additionally, users often need ways to navigate such complex and layered datasets beyond the current practice of using map-based metaphors, structured queries, visual time sequences, SQL queries, etc.

SUMMARY

Disclosed are a system and computer program product for presenting data in a graphical overlay. The system includes a processor that executes instructions which cause the processor to display the graphical overlay on a spatial rendering of data, where the graphical overlay includes a spatial rendering of data including one of a geospatial map, a logical map, and a system map. A first lens, including at least one first context, is overlaid on a first region of the graphical overlay, where the at least one first context is accessible by manipulation of the first lens. The at least one first context is activated within the first lens, and in response to activating the at least one first context, a first dataset, which corresponds to the first context, is obtained from at least one of a plurality of sources. The first dataset is displayed within the first lens, where the displayed first dataset is a visual representation of a first context dataset. A second lens including at least one second context, is overlaid on a second region of the graphical overlay. The at least one second context may be activated within the second lens. In response to activating the at least one second context within the second lens, a second dataset corresponding to the second context is obtained, and the second dataset is displayed within the second lens while simultaneously displaying the first dataset within the first lens. The displayed second dataset is a visual representation of a second context dataset. In response to simultaneously displaying the visual representations of the first and second context datasets, a correlation between the first and second datasets may be determined. In addition, a first region of the graphical overlay is circumscribed within each of the first lens and the second lens, and the first lens and the second lens are separated to provide one of a partially overlapping and a non-overlapping spatial relationship between the first and the second lens. In response to separating the first lens and the second lens, the first circumscribed region of the spatial rendering of data (i.e., geospatial, logical, or system map) within each of the first and second lenses are preserved, and a second non-circumscribed region may be concealed. The first dataset is thus displayed within the first lens and the second dataset is displayed within the second lens.

In some embodiments, the first lens is oriented in a first position, where the first dataset corresponds to the first position, and the first lens is rotated around an axis of rotation until the first lens is oriented in a second position. In response to rotating the first lens around the axis of rotation, the first dataset is reconfigured to provide a modified first dataset, and the modified first dataset is displayed within the first lens, where the modified first dataset corresponds to the second position. A rotational position of the first lens may be associated with specific points in time, where the first position corresponds to a first point in time and the first dataset represents the first dataset at the first point in time. In response to rotating the first lens in a first direction around the axis of rotation, to a second position that corresponds to a second point in time occurring after the first point in time, a corresponding later-in-time version of the first dataset is displayed within the first lens, where the later-in-time version of the first dataset corresponding to the second position includes projected data. In response to rotating the first lens in a second direction around the axis of rotation, to a second position that corresponds to a second point in time occurring before the first point in time, a corresponding earlier-in-time version of the first dataset is displayed within the first lens, where the earlier-in-time version of the first dataset corresponding to the second position includes historical data.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 9A-9B are schematic diagrams illustrating a method for inspecting a fixed region of a graphical overlay across a plurality of networks, in accordance with one embodiment;

FIGS. 13A-13B are flow charts illustrating the method for visually navigating data in a lens, in accordance with one embodiment.

DETAILED DESCRIPTION

Figure 1:
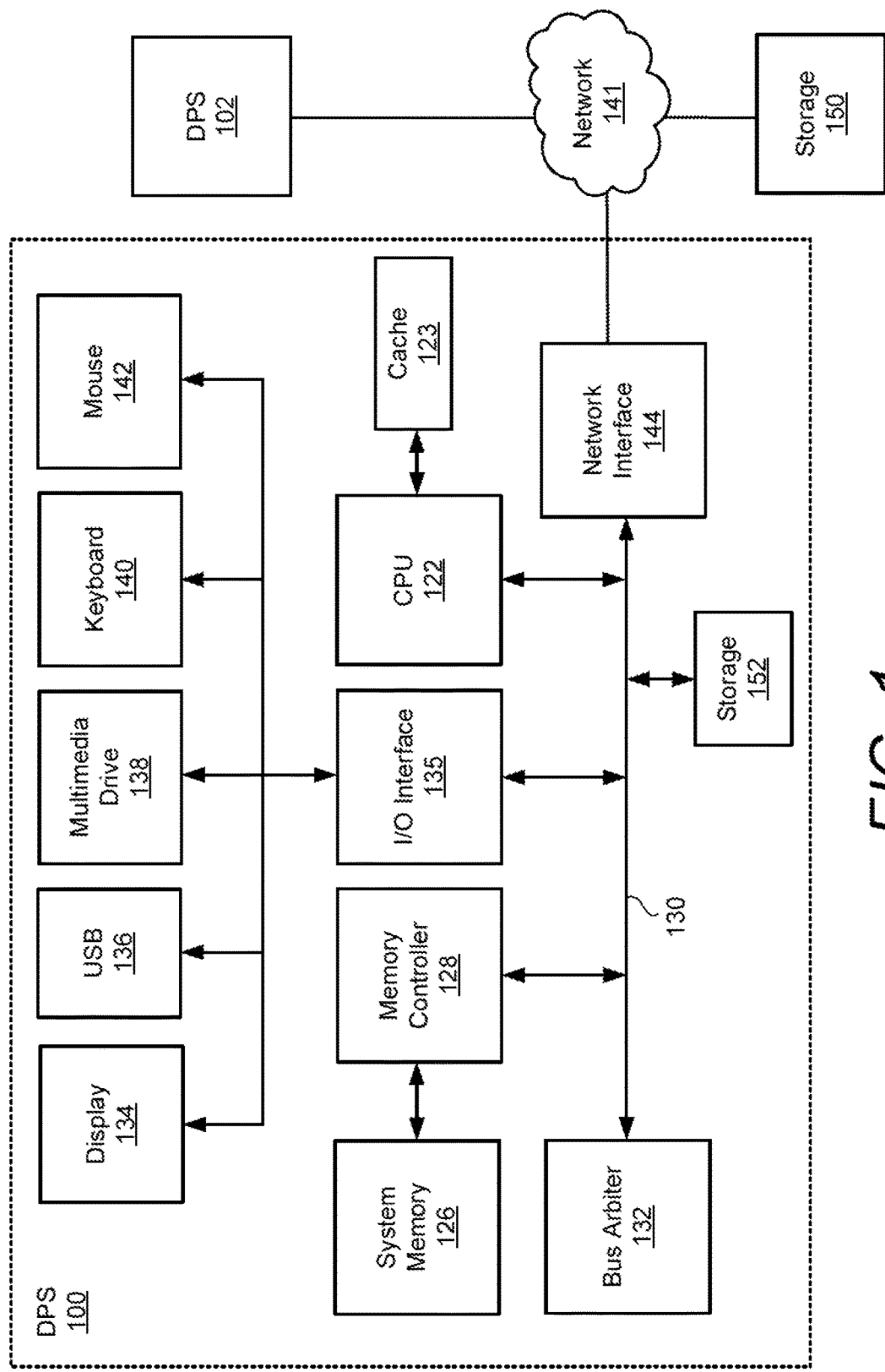
FIG. 1 provides a block diagram representation of an example data processing system within which the disclosure can be practiced, according to one embodiment.

The illustrative embodiments provide a system and computer program product for displaying a graphical overlay on a spatial rendering of data. A first lens, including a first dataset, is overlaid on a first region of the graphical overlay. A second lens, including a second dataset, is overlaid on a second region of the graphical overlay. The first and second datasets are simultaneously displayed, and a correlation between the first and second datasets is determined. In addition, separation of the overlapping first and second lenses results in preservation of a circumscribed region within each of the first and second lenses. The first dataset may also correspond to a first orientation position of the first lens. Rotation of the lens around an axis of rotation to a second orientation position results in reconfigured of the first dataset to provide a modified first dataset which corresponds to the second position. In some embodiments, a rotational position of the lens may also be associated with specific points in time, where a first position corresponds to a first point in time and the first dataset represents the first dataset at the first point in time. Rotation of the lens to a second position corresponds to a second point in time occurring before or after the first point in time, where a corresponding earlier-in-time or later-in-time version of the first dataset corresponds to the second position.

In the following detailed description of exemplary embodiments of the disclosure, specific exemplary embodiments in which the disclosure may be practiced are described in sufficient detail to enable those skilled in the art to practice the disclosure, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

In the following detailed description, numerous specific details such as specific method orders, structures, elements, and connections have been set forth. It is to be understood however that these and other specific details need not be utilized to practice embodiments of the present disclosure. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It is understood that the use of specific component, device and/or parameter names (such as those of the executing utility/logic described herein) are for example only and not meant to imply any limitations on the disclosure. The disclosure may thus be implemented with different nomenclature/terminology utilized to describe the components/devices/parameters herein, without limitation. Each term utilized herein is to be given its broadest interpretation given the context in which that terms is utilized.

Those of ordinary skill in the art will appreciate that the hardware components and basic configuration depicted in the presented figures may vary. For example, the illustrative components within the data processing system (DPS 100, FIG. 1) are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

With reference now to the figures, and beginning with FIG. 1, there is depicted a block diagram representation of an example data processing system (DPS), as utilized within one embodiment. The data processing system is described as having features common to a server computer. However, as used herein, the term "data processing system," is intended to include any type of computing device or machine that is capable of receiving, storing and running a software product including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the described embodiments. While embodiments will be described in the general context of instructions residing on hardware within a data processing system, those skilled in the art will recognize that embodiments may be implemented in a combination of program modules running in an operating system. Generally, program modules include routines, programs, components, and data structures, which perform particular tasks or implement particular abstract data types. The described features of the disclosure may also be practiced in distributed computing environments where tasks are performed by remote processing devices that are linked through a communications network. In a distributed computing environment, program modules may be located in both local and remote memory storage devices.

A DPS, such as DPS 100, can include at least one processing unit (CPU) 122, a system memory 126 coupled to a memory controller 128, and a system interconnect fabric 130 that couples memory controller 128 to CPU 122 and other components of DPS 100. System interconnect fabric 130 in an embodiment can be an address and data bus. Commands on system interconnect fabric 130 are communicated to various system components under the control of bus arbiter 132.

DPS 100 can further include cache memory 123 for high speed storage of frequently used data. Cache memory 123 can be connected to or communicatively coupled with CPU 122. While cache memory 123 is shown operatively connected to CPU 122, cache memory 123 can also operatively be a part of system memory 126.

DPS 100 further includes computer readable storage media, such as one or more multimedia drives 138, including for example hard disk drives. Multimedia drives 138 provide non-volatile storage for DPS 100. DPS 100 also includes one or more user interface devices, which allow a user to provide input and receive output from DPS 100. For example, user interface devices can include displays 134, universal serial bus (USB) ports 136, keyboards 140, and pointing devices such as a mouse 142. Multimedia drives 138 and the various user interface devices can be communicatively coupled to system interconnect fabric 130 by an input-output (I/O) interface 135. Although the description of computer readable storage media above refers primarily to a hard disk, it should be appreciated by those skilled in the art that other types of media which are readable by a computer, such as removable magnetic disks, CD-ROM disks, magnetic cassettes, flash memory cards, digital video disks, Bernoulli cartridges, and other later-developed hardware, may also be used in the exemplary computer operating environment.

DPS 100 also comprises storage 152, within which data/instructions/code may be stored. Storage 152 is communicatively coupled to system interconnect fabric 130. In addition to the above described hardware components of DPS 100, various features of the disclosure are completed via software (or firmware) code or logic stored within system memory 126 or other storage (e.g., storage 152) and executed by CPU 122. In one embodiment, data/instructions/code from storage 152 populates the system memory 126, which is also coupled to system interconnect fabric 130 via the memory controller 128.

DPS 100 may also operate in a networked environment using logical connections to one or more remote computers or data processing systems, such as DPS 102. DPS 102 may be a computer, a server, a router or a peer device and typically includes many or all of the elements described relative to DPS 100. In a networked environment, program modules employed by DPS 100, or portions thereof, may be stored in a remote memory storage device 150. The logical connections depicted in FIG. 1 can include connections over a network 141. In an embodiment, network 141 may be a local area network (LAN). In alternative embodiments, network 141 may include a wide area network (WAN). DPS 100 is connected to network 141 through an input/output interface, such as a network interface 144. It will be appreciated that the network connections shown are exemplary and other means of establishing a communications link between the computers may be used.

Figure 2:
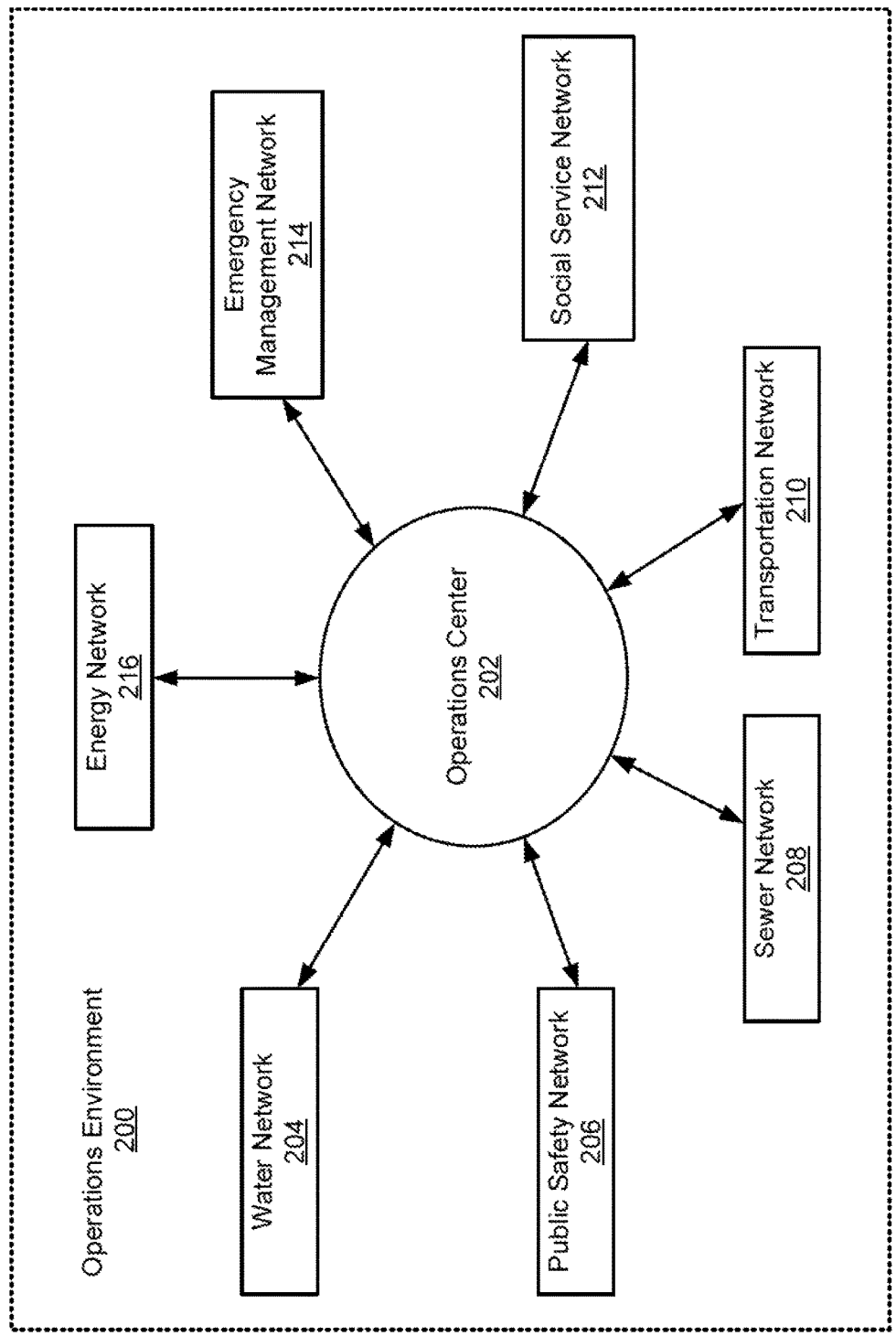
FIG. 2 illustrates a block diagram representation of an example operations environment in accordance with one embodiment.

FIG. 2 illustrates a block diagram representation of an example operations environment 200 in accordance with one embodiment. The operations environment 200, which may be for example a city, includes a plurality of networks, illustrated in FIG. 2 as a water network 204, a public safety network 206, a sewer network 208, a transportation network 210, a social services network 212, an emergency management network 214, and an energy network 216. Each one of the networks 204/206/208/210/212/216 as illustrated in FIG. 2 is intended to include all the infrastructure, applications, and data associated with each particular identified network. In some particular embodiments, each of the networks 204/206/208/210/212/216 may be equivalently referred to as a domain-specific operations center, where the term "domain," is used as an alternate, application specific way to identify all of the infrastructure, applications, and data related to the particular one of the identified networks, as described above. As shown in FIG. 2, each of water network 204, public safety network 206, sewer network 208, transportation network 210, social services network 212, emergency management network 214, and energy network 216 are communicatively coupled to a central operations center 202. In some embodiments, the central operations center 202 may be equivalently referred to as a cross-domain operations center. In practice, the central operations center 202 provides a holistic view of the operations environment 200 by serving as a centralized hub through which information is accessed and shared across each of the specific networks within the operations environment 200. Thus, data and information obtained from the various networks, as well as from other data sources, can be collectively analyzed and presented so as to enable well-informed decisions regarding the management and operations of networks within the operations environment 200.

To facilitate the collection and analysis of data/information from various sources, the illustrated operations environment 200 may include network-specific semantic models, which contain information related to a particular network (i.e., domain), including specifications, maintenance records/schedule, failure history, composition, and cost, among others. Moreover, in various embodiments, the operations environment 200 includes a reference semantic model which provides a linkage between/among the network-specific semantic models (i.e., between/among multiple data sets), and can be used to model complex relationships between and among the various network entities, for example in a city or enterprise, such as devices, equipment, buildings, infrastructure, etc. Thus, the reference semantic model can be used to model the relationship of such network entities to one another and to other non-tangible items mentioned above such as maintenance records/schedule, failure history, composition, and cost, among others. By modeling these relationships and associations, specific interactions between and among network entities may be better understood. However, in order to extract this information from the semantic models, complex queries (e.g., structured query language (SQL) queries) are used to retrieve the desired relational information. Furthermore, in various embodiments, in addition to data obtained via one or more semantic models as mentioned above, data within the operations environment 200 may include data from one or more of a plurality of other data sources such as historical data, projected data, user inputted data, web content, streaming content, data obtained from a local database, and data obtained from a remote database, among others. Users also often need ways to navigate such large, complex, and layered datasets beyond the current practice of using map-based metaphors, structured queries, visual time sequences, SQL queries, etc. Thus, the present disclosure provides a solution that addresses a need for an intuitive, singular way to render data (e.g., from one or more of a plurality of data sources) geospatially or in the context of an entire system or set of systems. Further, the present disclosure provides a solution that addresses a need for an intuitive way to rapidly visualize and comprehend complex, layered datasets, from one or more of a plurality of data sources, by providing a method for visually navigating data in a graphical overlay.

Figure 3:
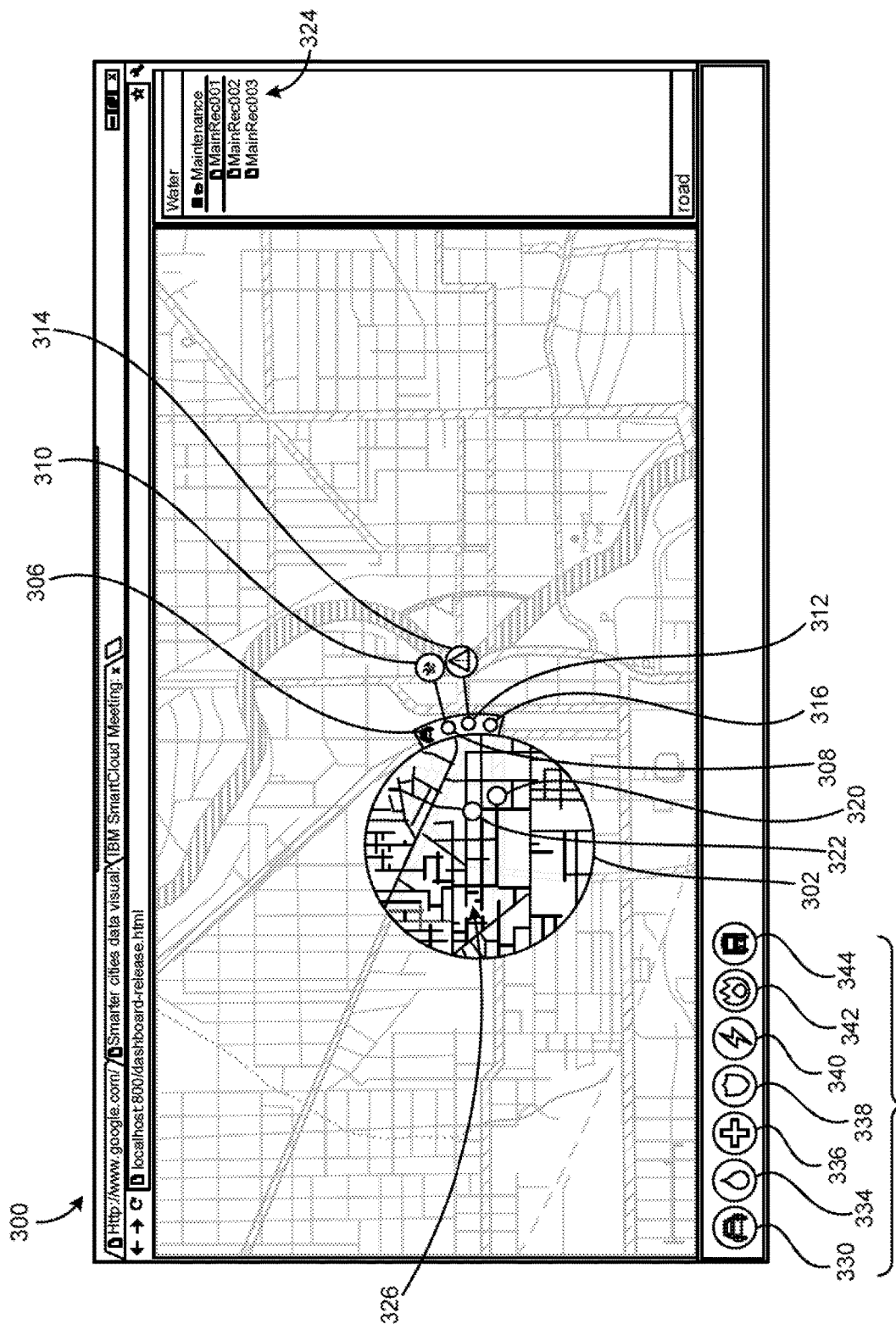
FIG. 3 is a graphical overlay illustrating at least one first context within a first lens according to one embodiment.

FIG. 3 illustrates a graphical overlay on a spatial rendering of data according to one embodiment. In some embodiments, as illustrated in FIG. 3, the graphical overlay 300 includes a geospatial map 300 which further includes a plurality of streets. Thus, as described herein, the geospatial map 300 may represent a city and/or region wherein one or more of the embodiments are practiced. Moreover, the embodiments discussed below with reference to FIGS. 3-10 can be accomplished within an operations environment, such as the operations environment 200 of FIG. 2. Further, the embodiments discussed herein can be used for various other applications including for example, visualization of social networks, internet of things, etc. Returning to FIG. 3, there is illustrated a lens 302 including at least one first context that is accessible by manipulation of the lens 302, as described below. As used herein, the term "context" is used to identify data/information related to a particular part of a given network and/or domain. Additionally, a given context may include one or more individual aspects. The terms "aspect", "context aspect", and "aspect of a context" are used to describe various facets of a given context. These various facets of a context provide different perspectives from which to view the same context, as described in more detail below. Considering the example of the lens 302, which corresponds to a transportation network as indicated by icon 306, a plurality of contexts related to the transportation network may include road maintenance records/schedules, areas of traffic congestion, areas where traffic accidents have occurred, roadway costs, predicted traffic, and other alerts/warnings which may be defined by the operations environment 200 and/or by the user. The data corresponding to the various contexts listed above may include data from one or more of a plurality of data sources such as semantic model data, historical data, projected data, user inputted data, web content, streaming content, data obtained from a local database, and data obtained from a remote database, among others. Moreover, the above list of exemplary contexts is merely illustrative, and not meant to be limiting in any way. Those skilled in the art will recognize many other contexts which may be included within this list, as well as other contexts which may be included as parts of other networks and/or domains.

The lens 302 is activated by selection of a transportation network icon 330 (e.g., by a mouse click and hold or via an interactive touch screen) and overlaying the icon on a region of the graphical overlay 300 (e.g., by a mouse drag or via an interactive touch screen). The lens 302 thus corresponds to a transportation network, and is one of a plurality of networks accessible via a network selection panel 328. Other networks accessible via the network selection panel 328 include a water management network 334, a healthcare network 336, a public safety network 338, an energy network 340, a fire network 342, and a public services network 344. The networks shown as accessible via the network selection panel 328 are for illustrative purposes only, and may, in other embodiments, include networks not listed here. For example, the networks can include those shown in FIG. 2, such as a sewer network 208, a social services network 212, and an emergency management network 214, as well as other networks such as an environmental network and a buildings network, among others. The choice of networks accessible via the network selection panel 328 may be dependent on specific application needs, such as the needs and/or requirements of the specific city or enterprise within which one or more of the embodiments described herein is being deployed.

Context visibility, which in some embodiments is equivalently used to describe context activation, within the lens 302 may be controlled by way of interactive icons 308, 312, 316. In some embodiments, as discussed further below, various contexts within the lens 302 are accessible by manipulation of the lens 302. As used herein, the term "manipulation of the lens" may include one or more of a variety of actions related to the lens 302 such as lens activation, interfacing with one or more of the interactive icons 308, 312, 316, lens translations (e.g., across the graphical overlay 300), and lens rotation, among others. As shown in FIG. 3, icon 308 is expanded to icon 310 (e.g., by a mouse hover and/or click or via an interactive touch screen), and icon 312 is similarly expanded to icon 314. In this example, icon 308/310 indicates a road maintenance records/schedules context, and icon 312/314 indicates a transportation alerts/warnings context. Activation of at least one of the transportation network contexts results in the at least one activated transportation network context being displayed within the lens 302. As indicated by arrow 326, elements of the transportation network related to the at least one activated transportation network context are highlighted within the area circumscribed by the lens 302. In some embodiments, upon activation of the lens 302, a default transportation network context is activated. In other embodiments, upon activation of the lens 302, no contexts are activated by default, and instead any activated contexts are user-activated. By way of example, consider that both the road maintenance records/schedule context (represented by icons 308/310) and the transportation alerts/warnings context (represented by icons 312/314) are activated. In various embodiments, activation of each of the road maintenance records/schedule context and the transportation alerts/warnings context results in obtaining data related to the road maintenance records/schedule context and the transportation alerts/warnings context, respectively, from one or more of a plurality of data sources and including, for example, semantic model data, historical data, projected data, user inputted data, web content, streaming content, data obtained from a local database, and data obtained from a remote database, among others. Further, in this example, activation of the road maintenance records/schedule context results in an icon 320 displayed within the lens 302 on the graphical overlay 300 which corresponds to a section of roadway that is scheduled for repair within a pre-defined time-frame. Further details regarding repair/maintenance records may also be made available for inspection via side panel 324.

Activation of the transportation alerts/warnings context results in an icon 322 displayed within the lens 302 on the graphical overlay 300, where icon 322 corresponds to an area of traffic congestion. Within the framework of the various embodiments described herein, displaying a context within a lens is equivalently a visual representation of a context dataset obtained from at least one of the plurality of data sources as described above. Thus, as shown in FIG. 3, displaying at least one of the road maintenance records/schedule context and the transportation alerts/warnings context within the lens 302 provides a method to visualize data from one or more of a plurality of sources in an intuitive way and within the same geospatial context.

Figure 4:
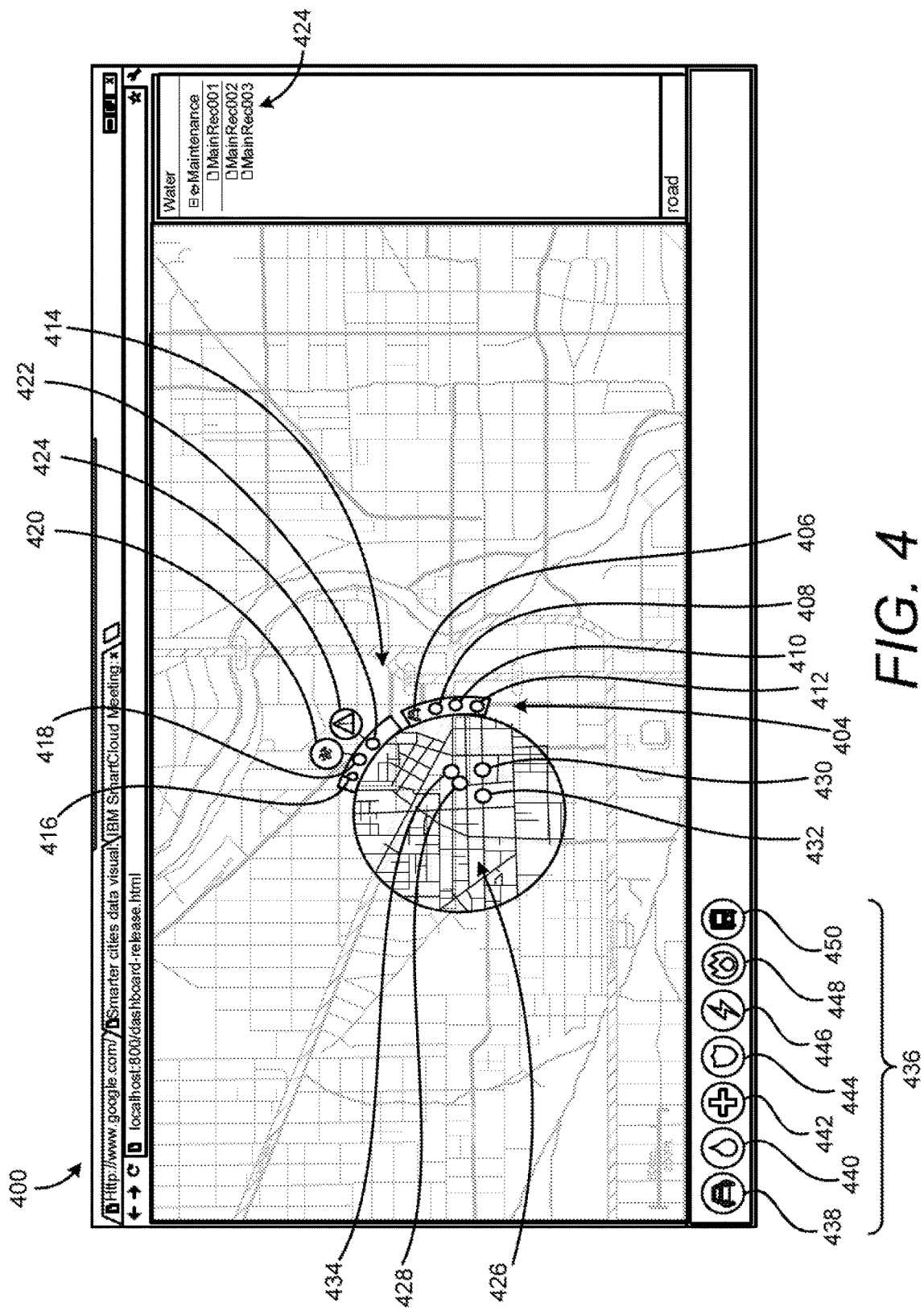
FIG. 4 is a graphical overlay illustrating at least one first context within a first lens and at least one second context within a second lens, in accordance with one embodiment.

FIG. 4 is a graphical overlay illustrating a first lens 404 including at least one first context and a second lens 414 including at least one second context, in accordance with one embodiment. The first lens 404 corresponds to a transportation network as indicated by icon 406 and the second lens corresponds to a water management network as indicated by icon 416. The first lens 404 is activated by selection of a transportation network icon 438 via a network selection panel 436 and overlaid on a region of the graphical overlay 400. In some embodiments, the second lens 414 is activated by selection of a water management network icon 440 via the network selection panel 436 and overlaid on the same region of the graphical overlay 400 as the first lens 404 such that the first lens 404 and the second lens 414 are in a fully overlapping spatial relation to each other. In other embodiments, as discussed below, the first lens 404 and the second lens 414 may be in one of a partially overlapping and non-overlapping spatial relation to each other.

Visibility of various transportation network contexts within the lens 404 is controlled by way of interactive icons 408, 410, 412, and visibility of water management network contexts within the second lens 414 is controlled by way of interactive icons 418, 422. As shown in FIG. 4, icon 418 is expanded to icon 420 (e.g., by a mouse hover and/or click or via an interactive touch screen), and icon 422 is similarly expanded to icon 424. In some embodiments, icon 418/420 indicates a water pipe maintenance records/schedules context, and icon 422/424 indicates a water management alerts/warnings context. Activation of at least one of the transportation network contexts results in the at least one activated transportation network context being displayed within the first lens 404, as indicated by arrow 426, where elements of the transportation network related to the at least one activated transportation network context are highlighted within the area circumscribed by the first lens 404. Similarly, activation of at least one of the water management network contexts results in the at least one activated water management network context being displayed within the second lens 414, as indicated by arrow 426, where elements of the water management network related to the at least one activated water management network context are highlighted within the area circumscribed by the second lens 414. In some embodiments, upon activation of either of the first or second lenses 404, 414, at least one of a default transportation and water management network context is activated. In other embodiments, upon activation of either of the first or second lenses 404, 414, no contexts are activated by default, and instead any activated contexts are user-activated.

As an example, consider that both the road maintenance records/schedule context (represented by icon 408) and the transportation alerts/warnings context (represented by icon 410) are activated, as described with reference to FIG. 3. Specifically, activation of the road maintenance records/schedule context results in an icon 430 displayed within the first lens 404 on the graphical overlay 400 which corresponds to a section of roadway that is scheduled for repair within a pre-defined time-frame, and activation of the transportation alerts/warnings context results in an icon 428 displayed within the first lens 404 on the graphical overlay 400 which corresponds to an area of traffic congestion. Now, consider that both the water pipe maintenance records/schedule context (represented by icons 418/420) and the water management alerts/warnings context (represented by icons 422/424) are activated. As a result, activation of the water pipe maintenance records/schedule context results in an icon 432 displayed within the lens 414 on the graphical overlay 400 which corresponds to a section of water pipe that is due for repair within a pre-defined time-frame. Additionally, activation of the water management alerts/warnings context results in an icon 434 displayed within the second lens 414 on the graphical overlay 400 which corresponds to an area of a slow water leak in one of the pipes. The slow water leak in turn appears to have caused a sinkhole in the adjacent roadway, and the sinkhole can be identified as a causal factor in the area of traffic congestion indicated by icon 428. As discussed above, displaying at least one of the road maintenance records/schedule context and the transportation alerts/warnings context within the first lens 404 corresponds to displaying a visual representation of a transportation network context dataset obtained from at least one of the plurality of data sources, as described above, within the first lens 404. Also, displaying at least one of the water pipe maintenance records/schedule context and the water management alerts/warnings context within the second lens 414 corresponds to displaying a visual representation of a water management network context dataset obtained from at least one of the plurality of data sources, as described above, within the second lens 414. Thus, by simultaneously displaying the visual representations of the transportation network context dataset and the water management network context dataset, a correlation between the transportation network context dataset and the water management network context dataset can be identified in accordance with at least one method of determination selected from one of an inference engine determination and a determination according to a set of rules. Further, as a result of identifying such correlations, well-informed decisions regarding the management and operations of the affected networks within the city and/or region represented by the graphical overlay 400 (i.e., the operations environment) can be made.

Figure 5:
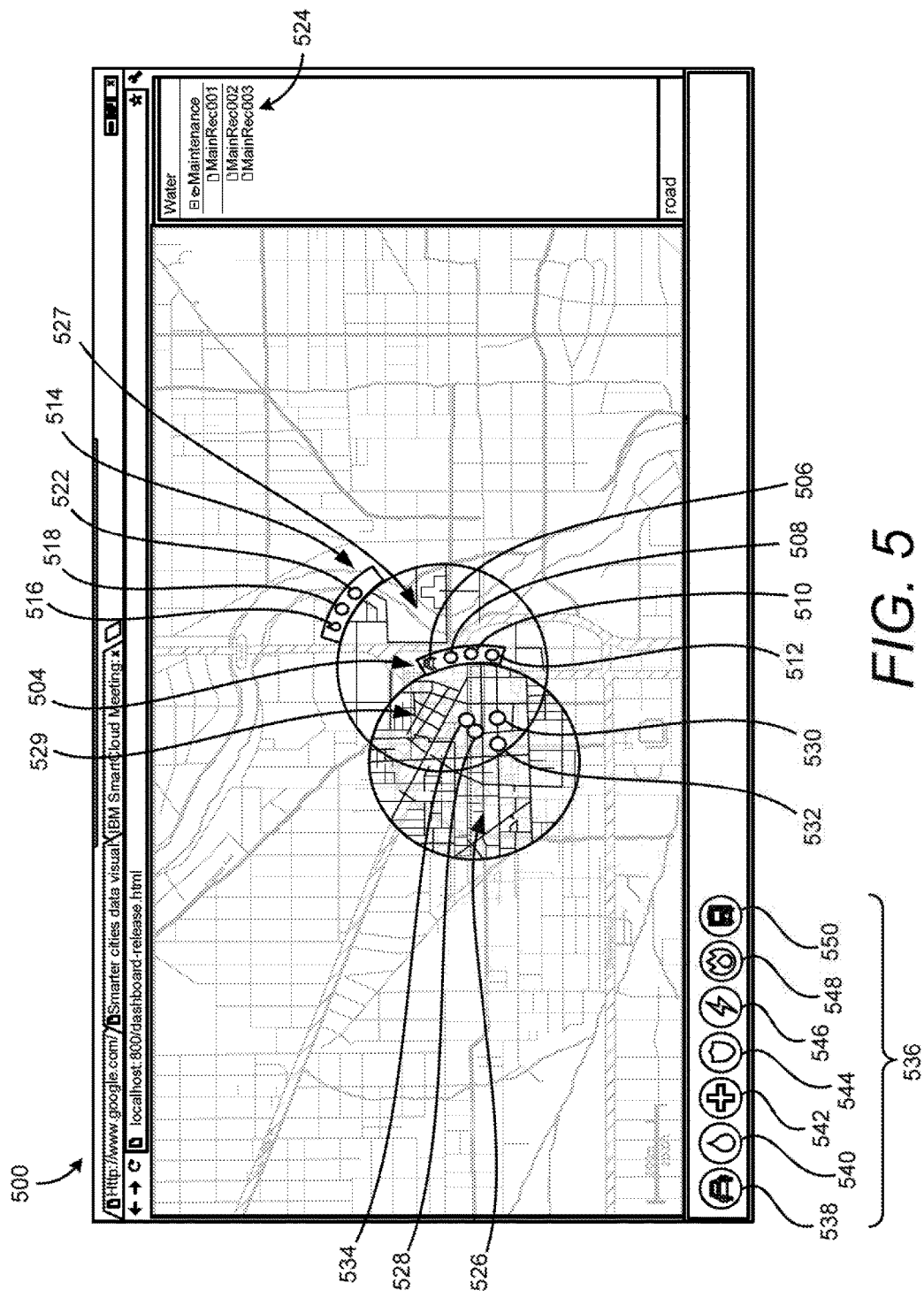
FIG. 5 is a graphical overlay illustrating at least one first context within a first lens and at least one second context within a second lens, in accordance with an alternative embodiment.

FIG. 5 is a graphical overlay illustrating a first lens 504 including at least one first context and a second lens 514 including at least one second context, in accordance with some embodiments. Similar to FIG. 4, the first lens 504 corresponds to a transportation network as indicated by icon 506 and the second lens corresponds to a water management network as indicated by icon 516. The first lens 504 is activated by selection of a transportation network icon 538 via a network selection panel 536 and overlaid on a first region of the graphical overlay 500. The second lens 514 is activated by selection of a water management network icon 540 via the network selection panel 536 and overlaid on a second region of the graphical overlay 500 such that the first lens 504 and the second lens 514 are in a partially overlapping spatial relation to each other. In other embodiments, as described herein, the first lens 504 and the second lens 514 may be in one of a fully overlapping and non-overlapping spatial relation to each other.

Visibility of various transportation network contexts within the lens 504 is controlled by way of interactive icons 508, 510, 512, and visibility of water management network contexts within the second lens 514 is controlled by way of interactive icons 518, 522. Activation of at least one of the transportation network contexts results in the at least one activated transportation network context being displayed within the first lens 504, as indicated by arrow 526, and activation of at least one of the water management network contexts results in the at least one activated water management network context being displayed within the second lens 514, as indicated by arrow 527. By way of example, consider that both a road maintenance records/schedule context (represented by icon 508) and a transportation alerts/warnings context (represented by icon 510) are activated, resulting in icons 530 and 528 displayed within the first lens 504 on the graphical overlay 500. Also, consider that both the water pipe maintenance records/schedule context (represented by icon 518) and the water management alerts/warnings context (represented by icon 522) are activated, resulting in icons 532 and 534 displayed within the second lens 514 on the graphical overlay 500. Although the first lens 504 and the second lens 514 are in a partially overlapping spatial relation to one another, as compared to the fully overlapping spatial relation shown in FIG. 4, a fully overlapping lenses region, indicated by arrow 529, displays the visual representations of both the transportation network context dataset and the water management network context dataset. The fully overlapping lenses region enables a correlation between the transportation network and the water management network to be identified (e.g., an area of a slow water leak in one of the pipes appearing to have caused a sinkhole in the adjacent roadway, which can be identified as causing traffic congestion in the adjacent roadway) within the fully overlapping lenses region. And as a result of identifying such correlations, well-informed decisions regarding the management and operations of the affected networks within the city and/or region represented by the graphical overlay 500 (i.e., the operations environment) can be made.

Figure 6:
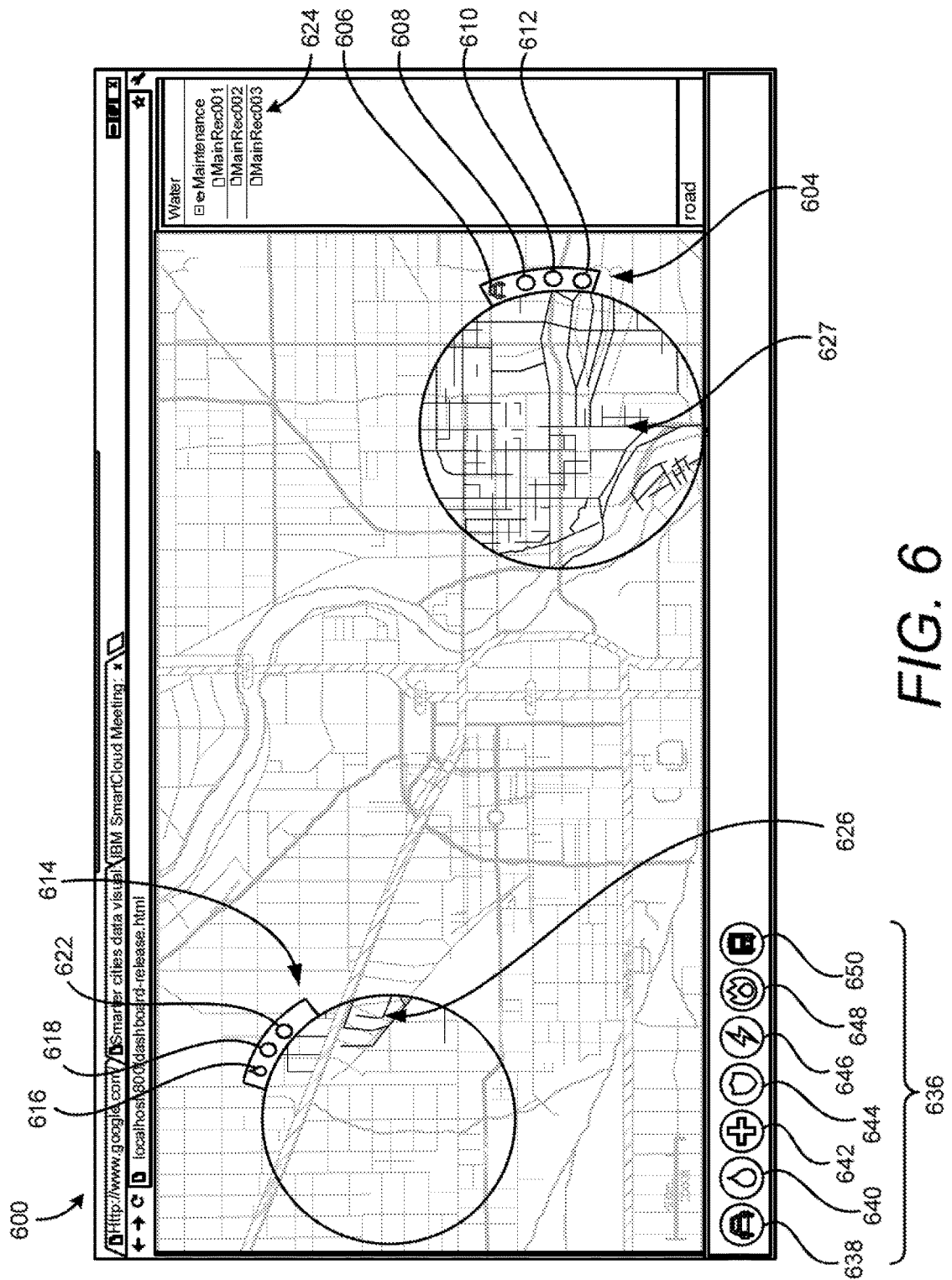
FIG. 6 is a graphical overlay illustrating at least one first context within a first lens and at least one second context within a second lens, in accordance with yet another embodiment.

FIG. 6 is a graphical overlay illustrating a first lens 604 including at least one first context and a second lens 614 including at least one second context, in accordance with some embodiments. As in FIGS. 4-5, the first lens 604 corresponds to a transportation network as indicated by icon 606 and the second lens corresponds to a water management network as indicated by icon 616. The first lens 604 is activated by selection of a transportation network icon 638 via a network selection panel 636 and overlaid on a first region of the graphical overlay 600. The second lens 614 is activated by selection of a water management network icon 640 via the network selection panel 636. The second lens 614 is overlaid on a second region of the graphical overlay 600 such that the first lens 604 and the second lens 614 are in a non-overlapping spatial relation to each other. In other embodiments, as described above, the first lens 604 and the second lens 614 may be in one of a fully overlapping and partially overlapping spatial relation to each other.

Visibility of various transportation network contexts within the lens 604 is controlled by way of interactive icons 608, 610, 612, and visibility of water management network contexts within the lens 614 is controlled by way of interactive icons 618, 622. Activation of at least one of the transportation network contexts results in the at least one activated transportation network context being displayed within the first lens 604, as indicated by arrow 627, and activation of at least one of the water management network contexts results in the at least one activated water management network context being displayed within the second lens 614, as indicated by arrow 626. In the example of FIG. 6, consider that at least one of a road maintenance records/schedule context (represented by icon 608) and a transportation alerts/warnings context (represented by icons 610) is activated; however, with no icons displayed within the first lens 604, a user may infer that there are currently no messages related to road maintenance and/or other transportation alerts/warnings that require attention. Similarly, consider that at least one of a water pipe maintenance records/schedule context (represented by icon 618) and a water management alerts/warnings context (represented by icon 622) is activated; however, with no icons displayed within the second lens 614, a user may infer that there are currently no messages related to water pipe maintenance and/or other water management alerts/warnings that require attention.

Figure 7:
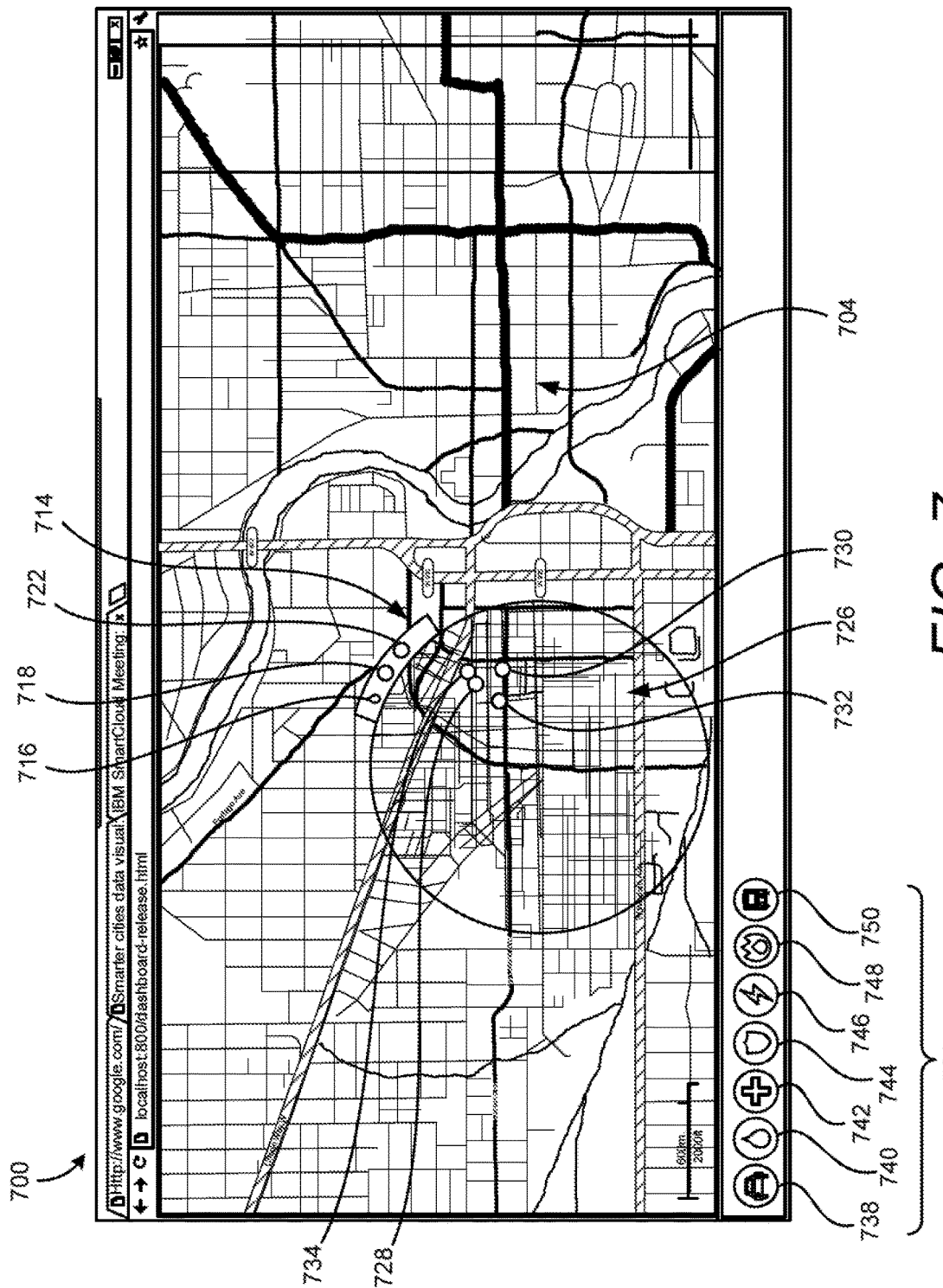
FIG. 7 is a graphical overlay illustrating at least one first context within a first lens and at least one second context within a second lens throughout the graphical overlay, in accordance with one embodiment.

FIG. 7 is a graphical overlay illustrating a lens 714 including at least one first context, and at least one second context which is displayed throughout the entire graphical overlay 700, as indicated by arrow 704, in accordance with one embodiment. In the example of FIG. 7, lens 714 corresponds to a water management network as indicated by icon 716 and the at least one second context corresponds to a transportation network. In some embodiments, the at least one second context is activated and displayed throughout the entire graphical overlay 700 by selection of a transportation network icon 738 (e.g., by a mouse click or via an interactive touch screen) via a network selection panel 736. The lens 714 is activated by selection of a water management network icon 740 via the network selection panel 736, and the lens 714 is overlaid on a region of the graphical overlay 700. In this example, regardless of the region on which the lens 714 is overlaid, the lens 714 (and thus the at least one first context) and the at least one second context are in a fully overlapping spatial relation to each other.

The at least one transportation network context displayed throughout the entire graphical overlay 700 may be activated by default upon selection of a transportation network icon 738, or the at least one transportation network context may be user-activated. Additionally, throughout the various embodiments described herein, one or more lenses can be activated by an external event trigger. Similarly, one or more domain contexts may be activated by an external event trigger such that an already active lens is populated with data and/or icons corresponding to the externally triggered domain context. Returning to FIG. 7, the visibility of water management network contexts within the lens 714 is controlled by way of interactive icons 718, 722. Activation of at least one of the transportation network contexts results in the at least one activated transportation network context being displayed throughout the entire graphical overlay 700, as indicated by arrow 704, and activation of at least one of the water management network contexts results in the at least one activated water management network context being displayed within the lens 714, as indicated by arrow 726. By way of example, consider that both a road maintenance records/schedule context and a transportation alerts/warnings context are activated, resulting in icons 728 and 730 displayed within the graphical overlay 700. Also, consider that both the water pipe maintenance records/schedule context (represented by icon 718) and the water management alerts/warnings context (represented by icon 722) are activated, resulting in icons 732 and 734 displayed within the lens 714 on the graphical overlay 700. As a result of simultaneously displaying the fully overlapping at least one transportation network context and the at least one water management network context, which represent fully overlapping visual representations of both the transportation network context dataset and the water management network context dataset, inferences regarding correlations between the transportation network and the water management network can be identified. In various embodiments, correlations between the transportation network and the water management network are determined in accordance with at least one method of determination selected from one of an inference engine determination and a determination according to a set of rules. Further, as a result of identifying such correlations, well-informed decisions can be made regarding the management and operations of the affected networks within the city and/or region represented by the graphical overlay 700 (i.e., the operations environment).

Figure 8:
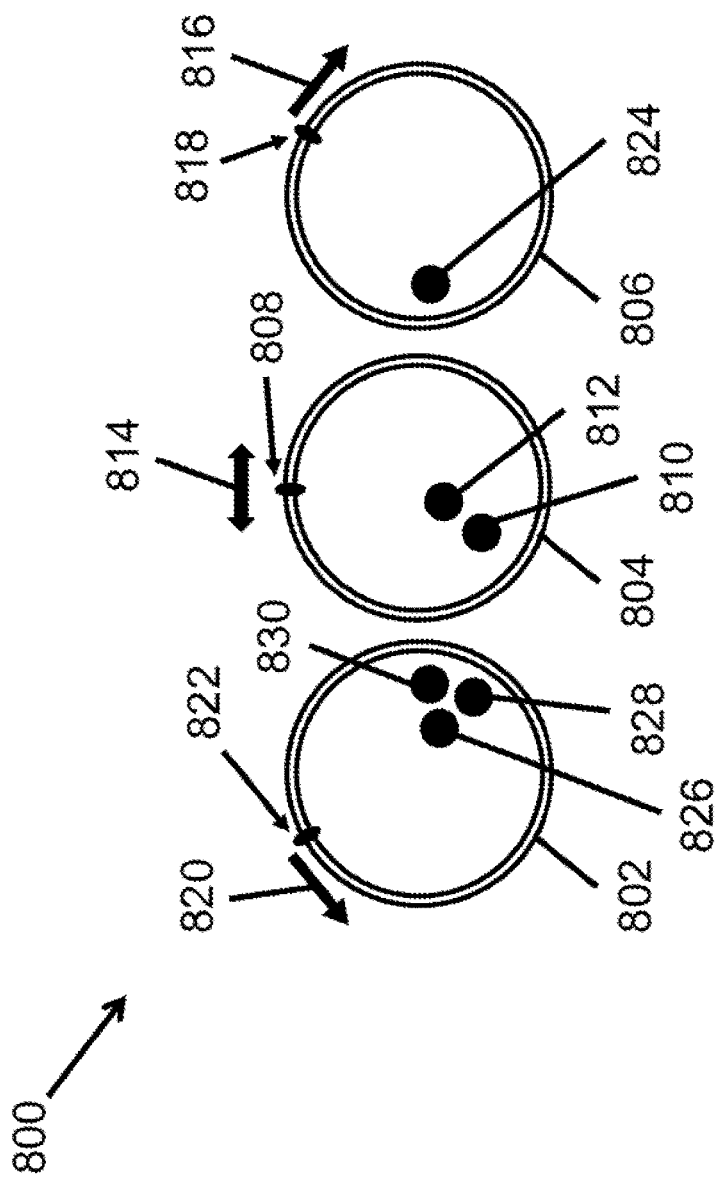
FIG. 8 is a schematic diagram illustrating a method for visually navigating data, according to one embodiment.

While the above discussion related primarily to embodiments for displaying data (e.g., from one or more of a plurality of data sources) geospatially, the following discussion relates primarily to embodiments useful for rapidly visualizing and comprehending complex, layered datasets, from one or more of a plurality of data sources, by providing a method for visually navigating data in a graphical overlay. Moreover, various embodiments facilitate manipulation of visualized data in a unique way which allows for better separation and uniting (e.g., visually) of causal factors (e.g., as discussed with reference to FIG. 4). By providing such methods for manipulation of visualized data, data mining becomes significantly easier, and users of various skill levels, from layman to expert user, are better able to quickly understand, predict, and fix problems. Referring now to FIG. 8, there is shown a schematic diagram illustrating a method 800 for visually navigating data in a lens 804 within a graphical overlay, according to one embodiment. Consider that the lens 804 is overlaid on a graphical overlay, which includes a spatial rendering of data including one of a geospatial map, a logical map, and a system map, in a first position indicated by bezel 808. The lens 804 may be rotated around an axis of rotation, for example by way of bezel 808, which, in some embodiments, can be moved by a mouse click/drag and/or by a touchscreen interface in an intuitive motion that simulates the motion of a dial. As shown, the lens 804 may be rotated in one of a clockwise and counter-clockwise direction, as indicated by arrow 814. In some embodiments, the lens 804 is rotated in a clockwise direction, as represented by lens 806 and indicated by arrow 816, to another position indicated by bezel 818. In other embodiments, the lens 804 is rotated in a counter-clockwise direction, as represented by lens 802 and indicated by arrow 820, to another position indicated by bezel 822. Thus, as shown in FIG. 8, the lenses 802, 804, 806 all represent the same lens which has been oriented in different rotational positions. In some embodiments, the different rotational positions are associated with specific points in time. However, in other embodiments, the various rotational positions may have alternate associations, as discussed below.

In some embodiments, the lens 804, and thus lenses 802 and 806, correspond to a first network and includes at least one first context. The first network may include one of a plurality of networks accessible via the operations environment 200 (FIG. 2), such as a transportation network, a water management network, a healthcare network, a public safety network, an energy network, a fire network, a public services network, a sewer network, a social services network, an emergency management network, an environmental network, and a buildings network, as well as others not listed here. The choice of networks accessible via the operations environment 200 may be dependent on specific application needs, such as the needs and/or requirements of the specific city or enterprise within which one or more of the embodiments described herein is being deployed.

Consider, for example, that lens 804, and thus lenses 802 and 806, correspond to a transportation network. As discussed above, for example with reference to FIG. 3, a plurality of contexts related to a transportation network may include road maintenance records/schedules, areas of traffic congestion, areas where traffic accidents have occurred, roadway costs, predicted traffic, and other alerts/warnings which may be defined by the operations environment 200 and/or by the user. In various embodiments, activation of one or more transportation network contexts results in obtaining data from one or more of a plurality of data sources and including, for example, semantic model data, historical data, projected data, user inputted data, web content, streaming content, data obtained from a local database, and data obtained from a remote database, among others.

Continuing with the example of a transportation network, consider that a road maintenance record/schedule context has been activated within the lens 804, and thus also within lenses 802 and 806, which all represent the same lens which have been oriented in different rotational positions. As a result of activating the road maintenance records/schedules context, a first dataset corresponding to the road maintenance records/schedules context is displayed within the lens 804, which is oriented in the first position, as represented by icons 810/812. In some embodiments, a rotational position may be associated with specific points in time, and the first position may correspond to a first point in time. Also, the first dataset corresponding to the road maintenance records/ schedules context represents the first dataset at the first point in time. Thus, for example, the first dataset displayed within the lens 804 (represented by icons 810/812) may represent areas of roadway that are undergoing maintenance and/or repair within a current time-frame. As used herein, the term "current time-frame" may include the present time and/or a particular window of time (e.g., happening now, within the last 24 hours, etc.) that also includes the present time. The current time-frame may be pre-defined and/or be user-defined.

As discussed above, the lens 804 may be rotated in a clockwise direction, as represented by lens 806 and indicated by arrow 816, to a second position indicated by bezel 818. In embodiments where a rotational position is associated with specific points in time, the second position, indicated by bezel 818, may correspond to a second point in time occurring after the first point in time, indicated by bezel 808. Thus, rotation of the lens 804 in the clockwise direction results in retrieval of a corresponding later-in-time version of the first dataset corresponding to the second position, as represented by icon 824, where the later-in-time version of the first dataset is a projected dataset. Therefore, in some embodiments, the later-in-time version of the first dataset (i.e., the projected data) displayed within the lens 806 (represented by icon 824) represents areas of roadway that are scheduled to undergo maintenance and/or repair at a future time (i.e., after the current time-frame).

Similarly, the lens 804 may be rotated in a counter-clockwise direction, as represented by lens 802 and indicated by arrow 820, to a second position indicated by bezel 822. In embodiments where a rotational position is associated with specific points in time, the second position, indicated by bezel 822, may correspond to a second point in time occurring before the first point in time, indicated by bezel 808. Thus, rotation of the lens 804 in the counter-clockwise direction results in retrieval of a corresponding earlier-in-time version of the first dataset corresponding to the second position, as represented by icons 826/828/830, where the earlier-in-time version of the first dataset is a historical dataset. For example, in some embodiments, the earlier-in-time version of the first dataset (i.e., the historical data) displayed within the lens 802 (represented by icons 826/828/830) represents areas of roadway that have previously undergone maintenance and/or repair (i.e., before the current time-frame).

As discussed above, lens rotation results in reconfiguration of the first dataset to provide a modified first dataset (e.g., an earlier-in-time and/or later-in-time version of the first dataset). Further, as used herein, reconfiguration of the first dataset by way of lens rotation (i.e., by way of manipulation of the lens) may be equivalently referred to as "cycling" of the first dataset. In some embodiments, for example in the case of two or more stacked lenses, "cycling" may also refer to stepping through individual datasets corresponding to each of the stacked lenses, as discussed in more detail with reference to FIG. 10. Thus, as described herein, lens cycling provides a valuable tool to improve trend analysis and anomaly detection, among others, by providing an intuitive interface and motion similar to that of a dial.

While FIG. 8 has been discussed with reference to a road maintenance records/schedules context of a transportation network, the embodiments described may be similarly applied to different contexts, for example such as historical traffic, current traffic, and projected traffic, among others. Also, while the above discussion included examples where different rotational positions were associated with specific points in time (i.e., temporal context modification), other embodiments may prescribe alternative associations, and thus alternative context modifications, to the various rotational positions. For example, in some embodiments, rotation of one lens or a plurality of stacked lenses may result in modification of a visualized aspect of a context, where a particular context may include a plurality of individual aspects. As used herein, the terms "visualize" or "visualized" are used to define something (e.g., a given context, aspect of a context, contextual semantic data, etc.) that is visible within the graphical overlay. Also, as discussed above, the various aspects of a context provide different perspectives from which to view the same context. Consider, for example, a travel mode context of a transportation network which includes a plurality of aspects related to various modes of travel (e.g., bus, train, car, bike, etc.), where activation of an aspect corresponding to one of these modes of travel (e.g., bus, train, car, bike, etc.) may result in visualization of travel routes available for the particular mode of travel that is active. Thus, within a single travel mode context, in some embodiments, changing between the various travel mode aspects (e.g., bus, train, car, bike, etc.) would allow for alternately visualizing the various travel routes for each mode of travel. Similarly, a directions context of a transportation network may include various aspects related to different types of directions between two or more locations, such as for example, shortest distance, shortest time, avoid/follow major highways, avoid/follow toll roads, etc. Thus, within a single directions context, changing between the various aspects (e.g., distance, time, major highways, toll roads, etc.) would allow for alternatively visualized directions between two or more locations. As another example, consider a water and/or sewer network having one or more contexts that provide a host of different aspects, such as for visualizing potable water pipes, sewage pipes, pipes installed within various timeframes (e.g., the last 5 years, 10 years, 50 years, etc.), and pipes composed of various materials (e.g., plastic, metal, etc.). Thus, as described above, rotation of one lens or rotation of a plurality of stacked lenses may serve to visualize many different aspects of a particular space, such as for example, a given area of a geospatial map. Various other associations to the rotational positions will be apparent to those skilled in the art, and the examples discussed herein are not meant to be limiting in any way.

FIG. 9 (A-B) is a schematic diagram illustrating a method for inspecting a fixed region of a graphical overlay across a plurality of networks, in accordance with one embodiment. Specifically, FIG. 9A illustrates a plurality of lenses 902 stacked in a fully overlapping position. In various embodiments, the plurality of lenses 902 is overlaid on a specific region of the graphical overlay such that the plurality of lenses 902 circumscribes a region 903. In other embodiments, the plurality of lenses 902 may be moved to another position within the graphical overlay, such that the plurality of lenses circumscribes a different region, in order to facilitate rapid visualization of data, from one or more of a plurality of data sources, along spatial axes. In some embodiments, each lens of the plurality of lenses 902 may correspond to a different network, such as for example the networks shown in FIG. 2. Moreover, one or more contexts may be activated within each lens of the plurality of lenses 902, thus facilitating identification of correlations between different networks based on visual patterns of data displayed within the stacked plurality of lenses 902.

FIG. 9B illustrates a method of separation of the plurality of lenses 902. Consider, by way of example, that a specific region of interest has been identified, such as the circumscribed region 903. In some embodiments, the circumscribed region 903 may be identified as a region of interest due to an identified correlation between different networks within the stacked plurality of lenses 902. Thus, in various embodiments, it may be of interest to further investigate the circumscribed region 903 through inspection of a single network (i.e., a single lens). In order to investigate the circumscribed region 903 through inspection of a single network, the plurality of lenses 902 may be pulled apart (e.g., by a mouse click/drag and/or by a touchscreen interface), as indicated by arrows 916/918, to inspect each lens of the plurality of lenses 902 individually. As used herein, the terms "pull apart", "pulled apart", and/or "pulling apart" are equivalently used to imply that two or more of a plurality of lenses are separated. As a result of pulling apart the plurality of lenses 902, each lens of the plurality of lenses 902 becomes visible.

As shown in the example of FIG. 9B, the plurality of lenses includes lens 904, 906, 908, 910, 912, 914. Each of the separated plurality of lenses 904, 906, 908, 910, 912, 914 may be in a partially overlapping spatial relationship, as shown, or they may be in a non-overlapping spatial relationship. Moreover, the circumscribed region 903, which may represent a circumscribed region of a spatial rendering of data (i.e., geospatial, logical, or system map), is preserved within each of the plurality of lenses 904, 906, 908, 910, 912, 914. Preservation of the circumscribed region 903 within each of the plurality of lenses 904, 906, 908, 910, 912, 914 facilitates juxtaposition of the lenses for further inspection of individual networks within the fixed region defined by the circumscribed region 903. In some embodiments, pulling apart the plurality of lenses 902 further results in concealment of any regions of the graphical overlay that are not contained within the circumscribed region 903. For example, in embodiments where the graphical overlay includes a geospatial map, pulling apart the plurality of lenses 902 results in concealment of any portion of the geospatial map that is not within the circumscribed region 903. After pulling apart the plurality of lenses 902, cycling of various context datasets may be done individually within each lens of the plurality of lenses 904, 906, 908, 910, 912, 914, as described above, in order to investigate the circumscribed region 903 through closer inspection by way of each of the single networks (i.e., single lenses) corresponding to each of the lenses 904, 906, 908, 910, 912, 914.

FIG. 10 (A-C) is a schematic diagram illustrating a method for visually navigating datasets from one or more of a plurality of contexts within a fixed region of a graphical overlay across a plurality of networks, in accordance with various embodiments. Specifically, FIG. 10 shows methods 1000, 1020, 1040 where a region of interest, such as circumscribed region 1003, has been identified for further investigation through inspection of one or more networks, according to various embodiments.

Figure 10A:
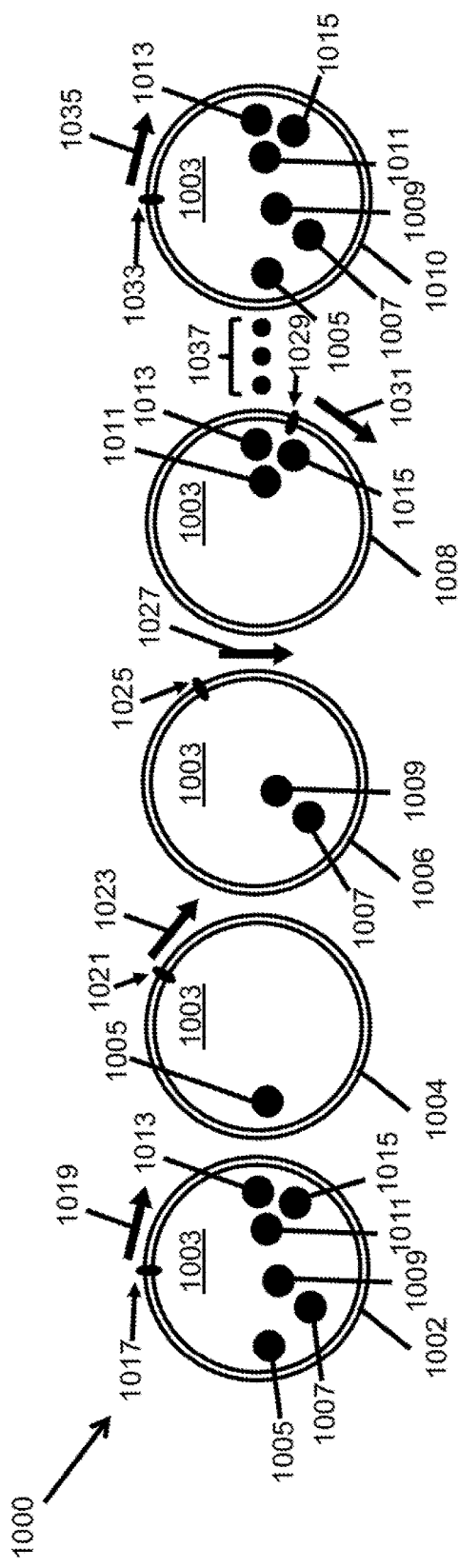
FIGS. 10A-10C are schematic diagrams illustrating a method for visually navigating data within a fixed region of a graphical overlay across a plurality of networks, in accordance with various embodiments.

FIG. 10A, showing method 1000, illustrates cycling through (i.e., stepping through) one or more context datasets of individual lenses by lens rotation, such that lenses 1002, 1004, 1006, 1008, 1010 represent a sequence of events occurring as a result of lens rotation. For example, a plurality of stacked lenses 1002 (representing the stacking of lenses 1004, 1006, 1008) includes a plurality of data 1005, 1007, 1009, 1011, 1013, 1015 corresponding to a plurality of networks associated with each of the stacked lenses 1004, 1006, 1008. The plurality of stacked lenses 1002 is oriented in a first position, as indicated by bezel 1017. In some embodiments, the plurality of stacked lenses 1002 is rotated (e.g., by way of bezel 1017) in a direction indicated by arrow 1019 to another position indicated by bezel 1021 of lens 1004. In some embodiments, rotation of the lenses results in concealment or revealing of one or more datasets, which correspond to one or more lenses of the plurality of stacked lenses. Concealing or revealing data by lens rotation illustrates an example of cycling through the datasets. For example, rotation to the position indicated by bezel 1021 results in displaying only the context dataset associated with the network related to lens 1004 (i.e., data 1005). From the position indicated by bezel 1021, the lens 1004 is rotated (e.g., by way of bezel 1021) in a direction indicated by arrow 1023 to another position indicated by bezel 1025 of lens 1006. In some embodiments, rotation to the position indicated by bezel 1025 results in displaying only the context dataset associated with the network related to lens 1006 (i.e., data 1007/1009). From the position indicated by bezel 1025, the lens 1006 is rotated (e.g., by way of bezel 1025) in a direction indicated by arrow 1027 to another position indicated by bezel 1029 of lens 1008. In some embodiments, rotation to the position indicated by bezel 1029 results in displaying only the context dataset associated with the network related to lens 1008 (i.e., data 1011/1013/1015). From the position indicated by bezel 1029, the lens 1008 is rotated (e.g., by way of bezel 1029) in a direction indicated by arrow 1031 to another position indicated by bezel 1033 (e.g., equivalent to the position indicated by bezel 1017) of the plurality of stacked lenses 1010 (representing the stacking of lenses 1004, 1006, 1008) where the plurality of context datasets related to all lenses are again revealed. Thus, similar to the plurality of stacked lenses 1002, the plurality of stacked lenses 1010 includes the plurality of data 1005, 1007, 1009, 1011, 1013, 1015 corresponding to the plurality of networks associated with all of the stacked lenses 1004, 1006, 1008.

Also, the ellipsis 1037 is shown to indicate additional steps that may be inserted into the sequence of events represented by method 1000, for example, by the addition of additional rotational positions, among others. Moreover, while the method 1000 discussed herein illustrates an example of navigating datasets across a plurality of networks, it will be readily understood that the embodiments discussed above related to FIG. 8 in regard to navigating time can be equally implemented within the context of the example of FIG. 10A. For example in some embodiments, while in a position indicated by bezel 1021, which displays only the data associated with the network related to lens 1004 (e.g., data 1005), a network navigation paradigm may be disengaged and a time navigation paradigm may be engaged, such that all the features regarding time navigation discussed with reference to FIG. 8 can now be applied with respect to lens 1004.

Furthermore, in other embodiments, method 1000 may represent cycling through a plurality of context datasets of the same network by way of rotation of an individual lens. For example, consider an example where all the lenses shown in method 1000 represent the same lens which is simply oriented in various positions. Thus, taking the example of a transportation network, lens rotation as described above with reference to method 1000 may result in cycling through individual contexts such as a road maintenance records/schedule context (e.g., represented by data 1005), a transportation alerts/warnings context (e.g., represented by data 1007/1009), as well as others. Moreover, in all embodiments which include two or more stacked lenses described herein and with reference to methods 1000/1020/1040 of FIG. 10 (A-C), it will be understood that individual lenses within the plurality of stacked lenses may each be rotated independently, rather than rotating all stacked lenses simultaneously. For example, one or more lenses in a stack of lenses may maintain a fixed position, while one or more other lenses in the stack of lenses are rotated.

Figure 10B:
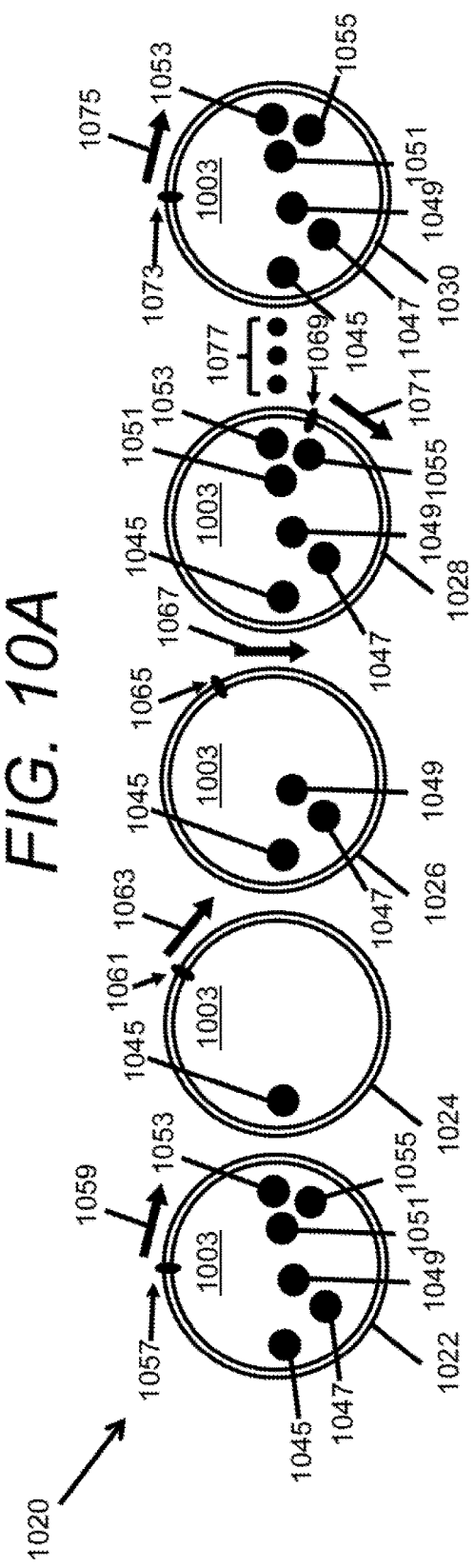

FIG. 10B, which shows method 1020, illustrates layering of context datasets by lens rotation, such that lenses 1022, 1024, 1026, 1028, 1030 represent a sequence of events occurring as a result of lens rotation. For example, a plurality of stacked lenses 1022 (representing the stacking of lenses 1024, 1026, 1028) includes a plurality of data 1045, 1047, 1049, 1051, 1053, 1055 corresponding to a plurality of networks associated with each of the stacked lenses 1024, 1026, 1028. The plurality of stacked lenses 1022 is oriented in a first position, as indicated by bezel 1057. In some embodiments, the plurality of stacked lenses 1022 is rotated (e.g., by way of bezel 1057) in a direction indicated by arrow 1059 to another position indicated by bezel 1061 of lens 1024. In some embodiments, rotation of the lenses results in concealment and/or revealing and stacking (i.e., layering) of one or more datasets, which correspond to one or more lenses of the plurality of stacked lenses. Concealing or revealing and/or stacking (i.e., layering) data by lens rotation illustrates an example of cycling through the datasets. For example, rotation to the position indicated by bezel 1061 results in displaying only the context dataset associated with the network related to lens 1024 (i.e., data 1045). From the position indicated by bezel 1061, the lens 1024 is rotated (e.g., by way of bezel 1061) in a direction indicated by arrow 1063 to another position indicated by bezel 1065 of lens 1026. In some embodiments, rotation to the position indicated by bezel 1065 results in stacking (i.e., layering) of the context datasets associated with the networks related to lenses 1024, 1026. Thus, rotation to the position indicated by bezel 1065 results in displaying the data associated with both the network related to lens 1024 (i.e., data 1045) and the network related to lens 1026 (i.e., data 1047/1049). In some embodiments, as described herein with reference to FIG. 10B, the lens 1026 may include reference to one or both of the individual lens 1026 and its associated data 1047/1049, and it may also include reference to the stacked lenses 1024, 1026 and their associated data 1045/1047/1049. From the position indicated by bezel 1065, the lens 1026 is rotated (e.g., by way of bezel 1065) in a direction indicated by arrow 1067 to another position indicated by bezel 1069 of lens 1028. In some embodiments, rotation to the position indicated by bezel 1069 results in stacking (i.e., layering) of the context datasets associated with the networks related to lenses 1024, 1026, 1028. Thus, rotation to the position indicated by bezel 1069 results in displaying the data associated with the network related to lens 1024 (i.e., data 1045), the network related to lens 1026 (i.e., data 1047/1049), and the network related to lens 1028 (i.e., data 1051/1053/1055). In some embodiments, as described herein with reference to FIG. 10B, the lens 1028 may include reference to one or more of the individual lens 1028 and its associated data 1051/1053/1055, and it may also include reference to the stacked lenses 1024, 1026, 1028 and their associated data 1045/1047/1049/1051/1053/1055. From the position indicated by bezel 1069, the lens 1028 is rotated (e.g., by way of bezel 1069) in a direction indicated by arrow 1071 to another position indicated by bezel 1073 (e.g., equivalent to the position indicated by bezel 1017) of the plurality of stacked lenses 1030, (representing the stacking of lenses 1024, 1026, 1028), where the plurality of context datasets related to all lenses are again revealed. Thus, similar to the plurality of stacked lenses 1022, the plurality of stacked lenses 1030 includes the plurality of data 1045, 1047, 1049, 1051, 1053, 1055 corresponding to the plurality of networks associated with all of the stacked lenses 1024, 1026, 1028.

Also, the ellipsis 1077 is shown to indicate additional steps that may be inserted into the sequence of events represented by method 1020, for example, by the addition of additional rotational positions, among others. Moreover, while the method 1020 discussed herein illustrates an example of navigating datasets across a plurality of networks, it will be readily understood that the embodiments discussed above related to FIG. 8 in regard to navigating time can be equally implemented within the context of the example of FIG. 10B. For example in some embodiments, while in a position indicated by bezel 1065, which displays the data associated with the networks related to lenses 1024, 1026 (e.g., data 1045/1047/1049), a network navigation paradigm may be disengaged and a time navigation paradigm may be engaged, such that all the features regarding time navigation discussed with reference to FIG. 8 can now be applied with respect to lens 1026.

Furthermore, in other embodiments, method 1020 may represent cycling through and stacking (i.e., layering) a plurality of context datasets of the same network by way of rotation of an individual lens. For example, consider an example where all the lenses shown in method 1020 represent the same lens which is simply oriented in various positions. Thus, taking the example of a transportation network, lens rotation as described above with reference to method 1020 may result in cycling through and stacking (i.e., layering) individual contexts such as a road maintenance records/schedule context (e.g., represented by data 1045), a transportation alerts/warnings context (e.g., represented by data 1047/1049), as well as others.

Figure 10C:
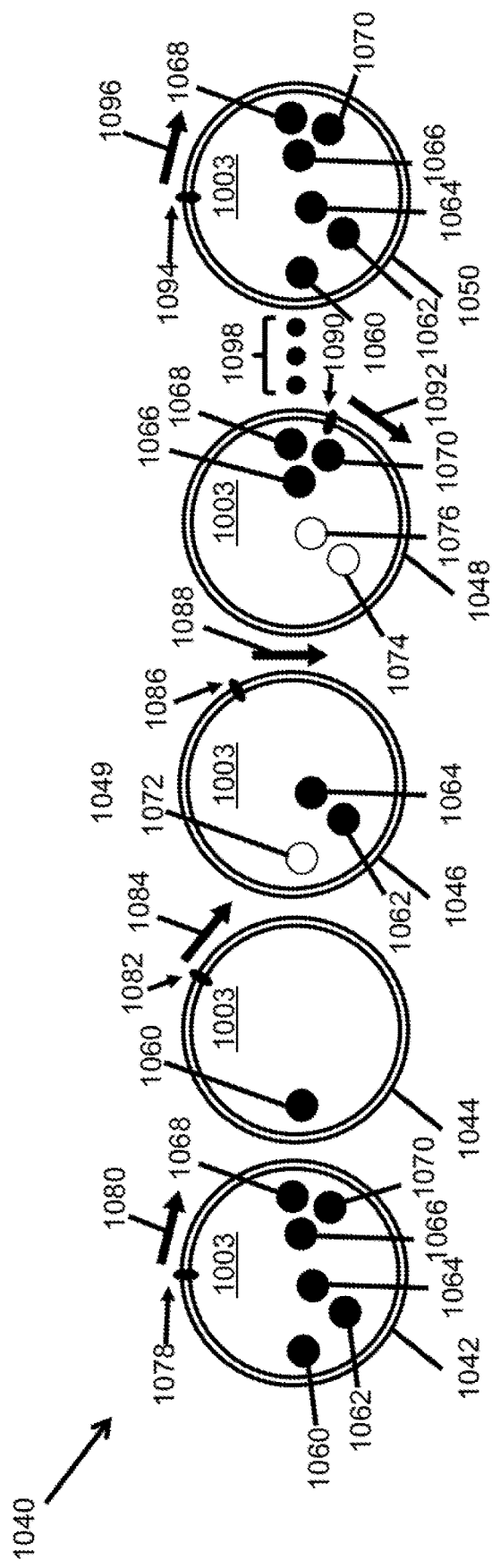

FIG. 10C, showing method 1040, illustrates cycling through context datasets by lens rotation and includes a ghosting effect, as described below. Further, lenses 1042, 1044, 1046, 1048, 1050 represent a sequence of events occurring as a result of lens rotation. For example, a plurality of stacked lenses 1042 (representing the stacking of lenses 1044, 1046, 1048) includes a plurality of data 1060, 1062, 1064, 1066, 1068, 1070 corresponding to a plurality of networks associated with each of the stacked lenses 1044, 1046, 1048. The plurality of stacked lenses 1042 is oriented in a first position, as indicated by bezel 1078. In some embodiments, the plurality of stacked lenses 1042 is rotated (e.g., by way of bezel 1078) in a direction indicated by arrow 1080 to another position indicated by bezel 1082 of lens 1044. In some embodiments, rotation of the lenses results in concealment and/or revealing and stacking (i.e., layering) of one or more datasets, which correspond to one or more lenses of the plurality of stacked lenses. As shown in FIG. 10C, one or more of the stacked datasets may include ghosted images of datasets. Concealing or revealing and/or stacking (i.e., layering) data by lens rotation, including ghosted images of datasets illustrates an example of cycling through the datasets. For example, rotation to the position indicated by bezel 1082 results in displaying only the context dataset associated with the network related to lens 1044 (i.e., data 1060). From the position indicated by bezel 1082, the lens 1044 is rotated (e.g., by way of bezel 1082) in a direction indicated by arrow 1084 to another position indicated by bezel 1086 of lens 1046. In some embodiments, rotation to the position indicated by bezel 1086 results in stacking (i.e., layering) of the context datasets associated with the networks related to lenses 1044, 1046. Moreover, rotation to the position indicated by bezel 1086 results in displaying the context dataset associated with the network related to lens 1046 (i.e., data 1062/1064) and a ghosted image 1072 of the data associated with the network related to lens 1044 (i.e., data 1060). In some embodiments, the ghosting effect may be used during network navigation, as in the example described above, where the ghosted image corresponds to the most recent previously displayed network. In other embodiments, the ghosting effect may be used during time navigation, where one or more networks (e.g., as represented by various lenses) are displayed, and the ghosted images of the of the context datasets which are displayed simultaneously with non-ghosted images of context datasets allow for simultaneous visualization of events that occurred at different times, thus improving trend analysis and anomaly detection. Further, in some embodiments during time navigation, the ghosted image of the dataset will fade out as the time distance between the current time and a time corresponding to when the event represented by the ghosted image first happened increases.

From the position indicated by bezel 1086, the lens 1046 is rotated (e.g., by way of bezel 1086) in a direction indicated by arrow 1088 to another position indicated by bezel 1090 of lens 1048. In some embodiments, rotation to the position indicated by bezel 1090 results in stacking (i.e., layering) of the context datasets associated with the networks related to lenses 1046, 1048. Moreover, rotation to the position indicated by bezel 1090 results in displaying the context dataset associated with the network related to lens 1048 (i.e., data 1066/1068/1070) and ghosted images 1074/1076 of the context dataset associated with the network related to lens 1046 (i.e., data 1062/1064). From the position indicated by bezel 1090, the lens 1048 is rotated (e.g., by way of bezel 1090) in a direction indicated by arrow 1092 to another position indicated by bezel 1094 (e.g., equivalent to the position indicated by bezel 1017) of the plurality of stacked lenses 1050, (representing the stacking of lenses 1044, 1046, 1048), where the plurality of context datasets related to all lenses are again revealed, without further ghosted images. Thus, similar to the plurality of stacked lenses 1042, the plurality of stacked lenses 1050 includes the plurality of data 1060, 1062, 1064, 1066, 1068, 1070 corresponding to the plurality of networks associated with all of the stacked lenses 1044, 1046, 1048.

In addition, the ellipsis 1098 is shown to indicate additional steps that may be inserted into the sequence of events represented by method 1040, for example, by the addition of additional rotational positions, among others. Moreover, while the method 1040 discussed herein illustrates an example of navigating datasets across a plurality of networks, it will be readily understood that the embodiments discussed above related to FIG. 8 in regard to navigating time can be equally implemented within the context of the example of FIG. 10C.

Furthermore, in other embodiments, method 1040 may represent cycling through and stacking (i.e., layering) a plurality of context datasets, including a ghosting effect, of the same network by way of rotation of an individual lens. For example, consider an example where all the lenses shown in method 1040 represent the same lens which is simply oriented in various positions. Thus, taking the example of a transportation network, lens rotation as described above with reference to method 1040 may result in cycling through and stacking (i.e., layering) individual contexts, such as a road maintenance records/schedule context (e.g., represented by data 1062/1064), and a ghosted image of a transportation alerts/warnings context (e.g., represented by data 1072), as well as others.

The various embodiments described above, and including the discussion of the flow charts below, collectively simplify and visualize the data mining process, and provide an intuitive and simple interface to visualize a plurality of data sources in such a way that users of all skill levels, from a layman to an expert user, are able to quickly understand the visualized data and thus more easily predict, and fix problems. For example, the embodiments described herein further provide the ability to visualize data sources both internal and external to any particular network within which a user is working. Moreover, the various embodiments provide the ability to manipulate the visualization of data in a unique way which allows for better separation and uniting (i.e., visually) of causal factors.

Figure 11:
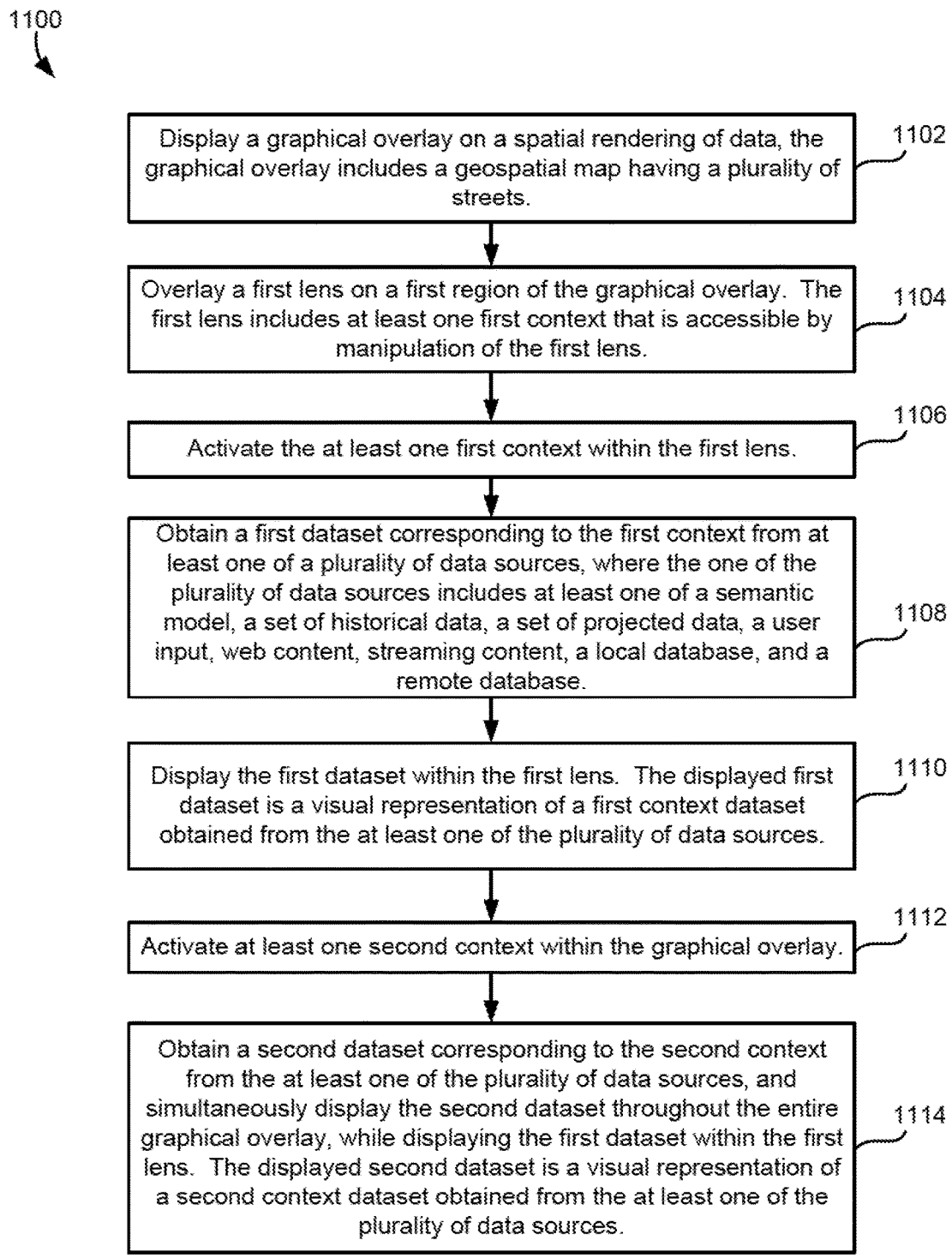
FIG. 11 is a flow chart illustrating the method for displaying data geospatially, in accordance with various embodiments.

FIG. 11 is a flow chart illustrating the method for displaying data (e.g., from one or more of a plurality of data sources) geospatially, in accordance with one embodiment. In the discussion of FIG. 11, reference is also made to elements described in FIG. 1 and FIG. 7. Computer implemented method 1100 can be implemented in DPS 100 or in DPS 100 in conjunction with DPS 102 and network 141, for example, by providing computer program instructions to a processor of DPS 100 or DPS 102 for execution of the program instructions to perform functions related to the visualization of context datasets within one or more lenses within a graphical overlay, as described herein with reference to method 1100.

Method 1100 starts with the display of a graphical overlay, such as the graphical overlay 700 having a plurality of streets, on a spatial rendering of data (block 1102). A first lens 714 corresponding to a first network, and including at least one first context, is overlaid on a first region of the graphical overlay 700 (block 1104). The at least one first context is accessible by manipulation of the first lens. In some embodiments, the first network corresponds to one of a water network, a public safety network, a sewer network, a transportation network, a social services network, an emergency management network, and an energy network. The at least one first context is activated (block 1106), for example, by way of interactive icons 718, 722. However, in some embodiments, a default context for each lens is already active, thus no initial explicit context activation is necessary unless an alternative, non-default context, is required. Activation of the at least one first context, whether such activation is by default or by explicit user activation, results in obtaining a first dataset corresponding to the first context from at least one of a plurality of data sources (block 1108). In various embodiments, the one of the plurality of data sources includes at least one of a semantic model, a set of historical data, a set of projected data, a user input, web content, streaming content, a local database, and a remote database, among others. The first dataset is displayed within the first lens 714 (block 1110). Moreover, the displayed first dataset is a visual representation of a first context dataset obtained from the at least one of the plurality of data sources. At least one second context is activated (block 1112). Thereafter, a second dataset corresponding to the second context is obtained from the at least one of the plurality of data sources, and the second dataset is displayed throughout the entire graphical overlay, while simultaneously displaying the first dataset within the first lens (block 1114). The displayed second dataset is a visual representation of a second context dataset obtained from the at least one of the plurality of data sources. In the method 1100, regardless of the region on which the first lens 714 is overlaid, the first lens 714 (and thus the at least one first context) and the at least one second context are in a fully overlapping spatial relation to each other.

Figure 12:
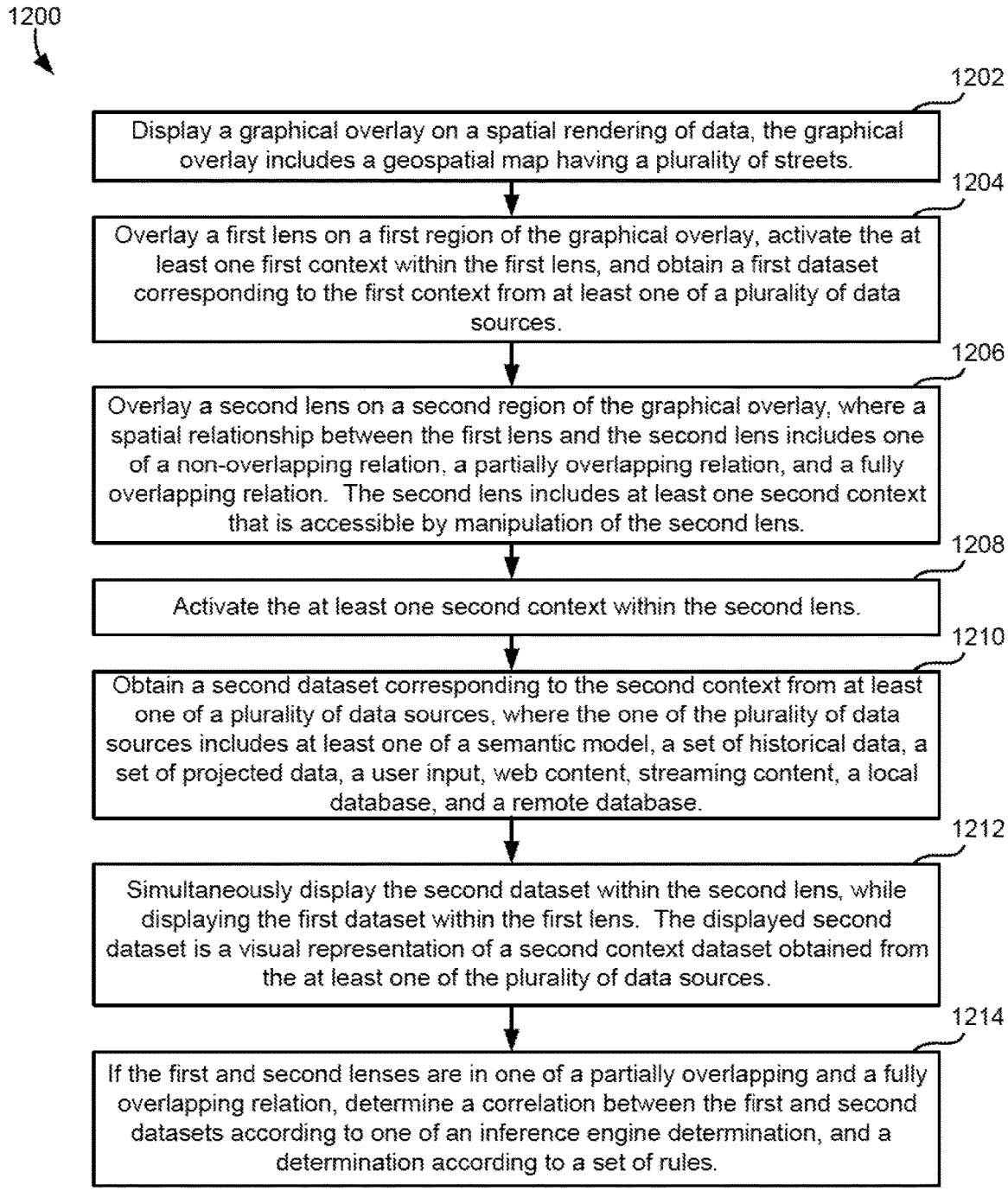
FIG. 12 is a flow chart illustrating the method for displaying a first dataset within a first lens and a second dataset within a second lens, in accordance with one embodiment.

FIG. 12 is a flow chart illustrating the method for displaying a first dataset within a first lens and a second dataset within a second lens, in accordance with one embodiment. In the discussion of FIG. 12, reference is also made to elements described in FIG. 1 and FIG. 4. Computer implemented method 1200 can be implemented in DPS 100, for example, by providing computer program instructions to a processor of DPS 100 for execution of the program instructions to perform functions related to the visualization of context datasets within one or more lenses within a graphical overlay, as described herein with reference to method 1200.

Method 1200 starts with the display of a graphical overlay, such as the graphical overlay 400 having a plurality of streets, on a spatial rendering of data (block 1202). A first lens 404 corresponding to a first network, and including at least one first context, is overlaid on a first region of the graphical overlay 400 (block 1204). The at least one first context is activated within the first lens, and a first dataset, which corresponds to the first context, is obtained from at least one of a plurality of data sources. A second lens 414 corresponding to a second network, and including at least one second context, is overlaid on a second region of the graphical overlay 400 (block 1206). The at least one second context is accessible by manipulation of the second lens. In various embodiments, the spatial relation between the first and second lenses 404, 414 includes one of a non-overlapping relation, a partially overlapping relation, and a fully overlapping relation. The at least one second context is activated within the second lens 414 (block 1208). Responsive to activating the at least one second context, a second dataset corresponding to the second context is obtained from the at least one of a plurality of data sources (block 1210). Thereafter, the second dataset is displayed within the second lens, while simultaneously displaying the first dataset within the first lens (block 1212). The displayed second dataset is a visual representation of a second context dataset obtained from the at least one of the plurality of data sources. By simultaneously displaying the visual representations of the first and second context datasets, and if the first and second lenses are in one of a partially overlapping and a fully overlapping relation, a correlation between the first and second datasets can be determined (block 1214), for example according to one of an inference engine determination and a determination according to a set of rules. As a result of identifying such correlations, well-informed decisions can be made regarding the management and operations of the affected networks within the city and/or region represented by the graphical overlay 400 (i.e., the operations environment).

Figure 13B:
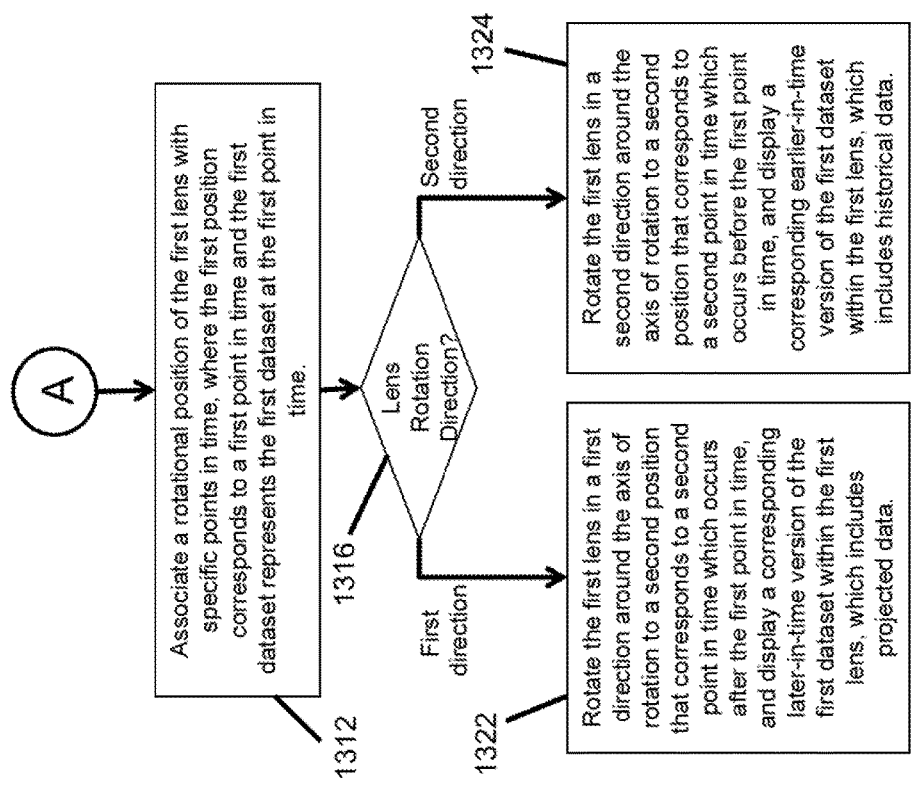

FIG. 13 (A-B) is a flow chart illustrating the method for visually navigating data in a lens, in accordance with one embodiment. Computer implemented method 1300 can be implemented in DPS 100 or in DPS 100 in conjunction with DPS 102 and network 141, for example, by providing computer program instructions to a processor of DPS 100 or DPS 102 for execution of the program instructions to perform functions related to the visual navigation of data within one or more lenses, and from one or more of a plurality of data sources, as described herein with reference to the method 1300.

Method 1300 starts with the overlay of a first lens on a graphical overlay (block 1302), which includes a spatial rendering of data including one of a geospatial map, a logical map, and a system map. The first lens includes a first context and a first dataset corresponding to the first context. The first lens is oriented in a first position. In some embodiments, the first network corresponds to one of a water network, a public safety network, a sewer network, a transportation network, a social services network, an emergency management network, and an energy network. An option to monitor temporal changes within the data (i.e., navigate time) is presented (decision block 1304). In some embodiments, if temporal changes are not monitored, then the first dataset is displayed within the first lens (block 1306). Further, the first dataset corresponds to the first position. The first lens is rotated around an axis of rotation until the first lens is oriented in a second position (block 1308). In response to rotating the first lens around the axis of rotation, the first dataset is reconfigured to provide a modified first dataset (block 1310). An option to activate ghosting of the data is presented (decision block 1314). In some embodiments, if ghosting is not activated, the modified first dataset is displayed within the first lens (block 1318). Moreover, the modified first dataset corresponds to the second position. In other embodiments, if ghosting is activated, the modified first dataset corresponding to the second position, and a ghosted image of the first dataset corresponding to the first position are simultaneously displayed (block 1320), for example in the first lens. In other embodiments, if temporal changes are monitored, a rotational position of the first lens is associated with specific points in time (block 1312). For example, the first position may correspond to a first point in time and the first dataset represents the first dataset at the first point in time. One of two lens rotation directions is selected (block 1316). In some embodiments, the first lens is rotated in a first direction (e.g., a clockwise direction) around the axis of rotation to a second position that corresponds to a second point in time which occurs after the first point in time, and where a corresponding later-in-time version of the first dataset is displayed (block 1322). In some embodiments, the later-in-time version of the first dataset is a projected dataset. In other embodiments, the first lens is rotated in a second direction (e.g., a counter-clockwise direction) around the axis of rotation to a second position that corresponds to a second point in time which occurs before the first point in time, and where a corresponding earlier-in-time version of the first dataset is displayed (block 1324). In some embodiments, the earlier-in-time version of the first dataset is a historical dataset.

Figure 14:
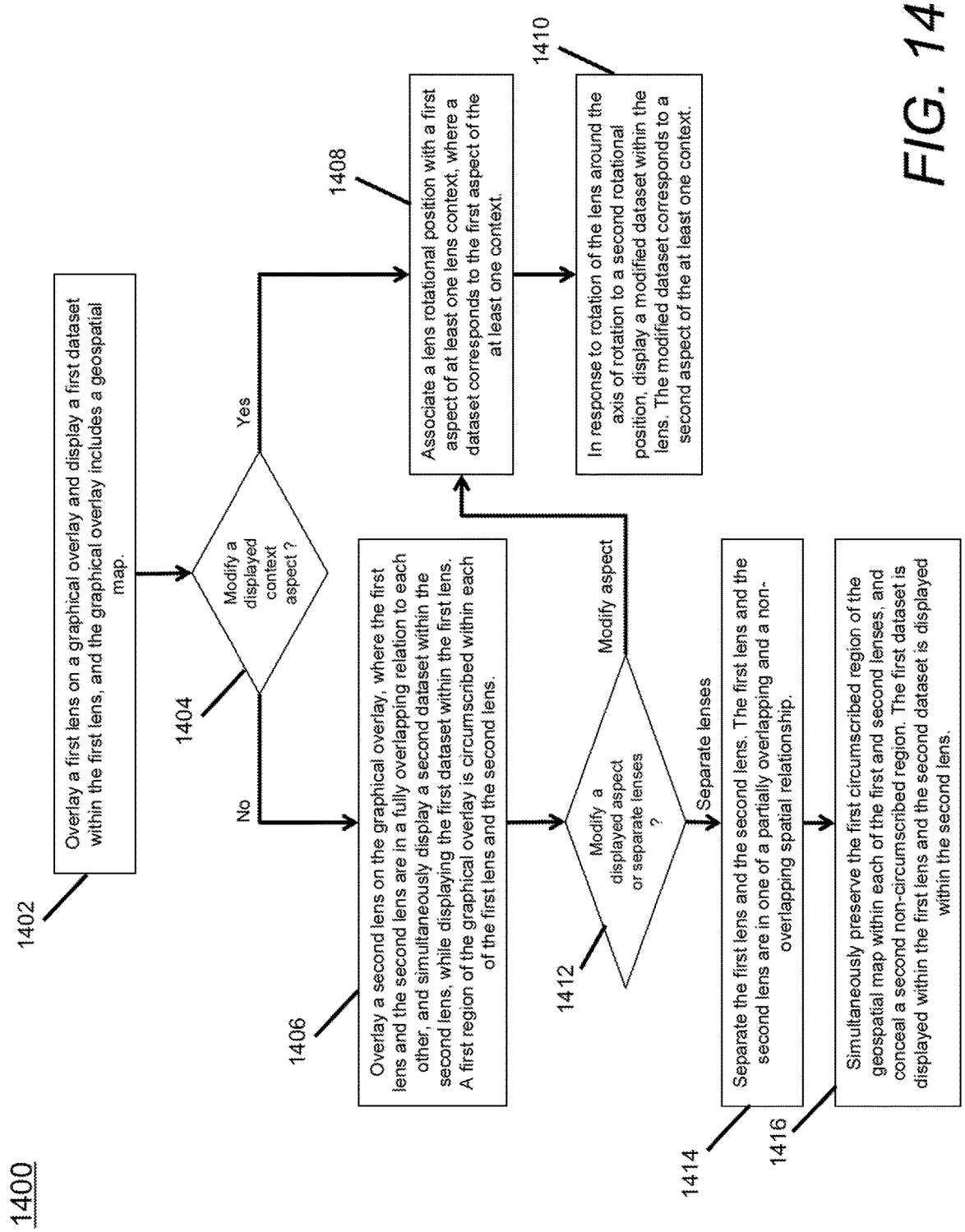
FIG. 14 is a flow chart illustrating the method for visually navigating data in a plurality of lenses, in accordance with one embodiment.

FIG. 14 is a flow chart illustrating the method for visually navigating data in a plurality of lenses, in accordance with one embodiment. Computer implemented method 1400 can be implemented in DPS 100 or in DPS 100 in conjunction with DPS 102 and network 141, for example, by providing computer program instructions to a processor of DPS 100 or DPS 102 for execution of the program instructions to perform functions related to the visual navigation of data within a plurality of lenses, from one or more of a plurality of data sources, as described herein with reference to the method 1400.

Method 1400 starts with the overlay of a first lens on a graphical overlay (block 1402), which includes a spatial rendering of data including one of a geospatial map, a logical map, and a system map. A first dataset is displayed within the first lens. An option to modify a displayed context aspect is presented (decision block 1404). In some embodiments, the displayed context aspect is changed, and a rotational position of the first lens is associated with a first aspect of the at least one context, where the first dataset corresponds to the first aspect of the at least one context (block 1408). In response to rotation of the first lens around the axis of rotation to a second rotational position, a modified first dataset is displayed within the first lens (block 1410). Moreover, the modified first dataset corresponds to a second aspect of the at least one context. In other embodiments, the displayed context aspect is not changed, and a second lens is overlaid on the graphical overlay (block 1406). The first lens and the second lens are in a fully overlapping relation to each other, and a second dataset is displayed within the second lens, while simultaneously displaying the first dataset within the first lens. Also, a first region of the graphical overlay is circumscribed within each of the first lens and the second lens. Thereafter, an option to either modify a displayed context aspect of the first and/or second lens, or to pull apart (i.e., to separate) the first and second lenses is presented (block 1412). In some embodiments, when a displayed context aspect of one or both of the first and second lenses is to be changed, the method 1400 returns to associate a lens rotational position with a first aspect (block 1408), and rotation of either one or both of the first and second lenses to a second rotational position results in displaying a modified dataset that corresponds to a second context aspect (block 1410). In other embodiments, the first and second lens are separated (block 1414), for example to allow for investigation of the circumscribed first region through inspection of a single network (i.e., a single lens), and the first and second lenses are thus in one of a partially overlapping and non-overlapping spatial relationship. Separation of the first and second lenses results in simultaneous preservation of the first circumscribed region of the graphical overlay (i.e., a first region of a geospatial map) within each of the first and second lenses (block 1416). In addition, in some embodiments, any non-circumscribed region of the graphical overlay may be concealed. After separation of the first and second lenses, the first dataset is displayed within the first lens and second dataset is displayed within the second lens, for example, while the first and second lens are in one of a partially overlapping and non-overlapping spatial relationship.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

As will be appreciated by one skilled in the art, aspects of the present disclosure may be embodied as a system, method or computer program product. Accordingly, aspects of the present disclosure may take the form of an entirely hardware embodiment or an embodiment combining software (including, for example, firmware, resident software, micro-code, etc.) and hardware aspects that may all generally be referred to herein as a "circuit," "module" or "system." Furthermore, aspects of the present disclosure may take the form of a computer program product embodied in one or more computer readable storage devices or other computer readable medium(s) having computer readable program code embodied thereon.

Any combination of one or more computer readable medium(s) may be utilized. The computer readable medium may be a computer readable signal medium or a computer readable storage device. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage device and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can configure a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the disclosure may be practiced by combining one or more machine-readable storage devices containing the code according to the present disclosure with appropriate processing hardware to execute the code contained therein. An apparatus for practicing the disclosure could be one or more processing devices and storage systems containing or having network access to program(s) coded in accordance with the disclosure.

Thus, it is important that while an illustrative embodiment of the present disclosure is described in the context of a fully functional computer (server) system with installed (or executed) software, those skilled in the art will appreciate that the software aspects of an illustrative embodiment of the present disclosure are capable of being distributed as a program product in a variety of forms, and that an illustrative embodiment of the present disclosure applies equally regardless of the particular type of media used to actually carry out the distribution.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While particular embodiments of the present disclosure have been shown and described, it will be obvious to those skilled in the art that, based upon the teachings herein, changes and modifications may be made without departing from this disclosure and its broader aspects. Consequently, the appended claims are to encompass within their scope all such changes and modifications as are within the true spirit and scope of this disclosure and embodiments of the disclosure are intended to be limited only by the scope of the appended claims, giving full cognizance to equivalents in all respects.

What is claimed is:

1. A data processing system comprising:
   at least one storage device having a set of instructions located therein; and
   at least one processor in communication with the at least one storage device, wherein the at least one processor executes the set of instructions which cause the at least one processor to:
   display a graphical overlay on a spatial rendering of data;
   overlay a first lens on a first region of the graphical overlay, wherein the first lens includes at least one first context that is accessible by manipulation of the first lens and at least one interactive icon associated with the at least one first context;
   in response to receiving, at the at least one interactive icon, a first action associated with the at least one first context, activate the at least one first context within the first lens;
   in response to activating the at least one first context within the first lens, obtain a first dataset corresponding to the at least one first context from at least one of a plurality of data sources;
   display the first dataset within the first lens, wherein the displayed first dataset is a visual representation of a first context dataset obtained from the at least one of the plurality of data sources;
   overlay a second lens on a second region of the graphical overlay, wherein the second lens includes at least one second context that is accessible by manipulation of the second lens;
   in response to receiving, at the second lens, a second action associated with the at least one second context, activate the at least one second context within the second lens;
   in response to activating the at least one second context within the second lens, obtain a second dataset corresponding to the at least one second context from the at least one of the plurality of data sources;
   simultaneously display the second dataset within the second lens and the first dataset within the first lens, wherein the displayed second dataset is a visual representation of a second context dataset obtained from the at least one the plurality of data sources;
   circumscribe a first region of the graphical overlay within each of the first lens and the second lens, wherein the graphical overlay comprises a geospatial map;
   separate the first lens and the second lens, wherein the first lens and the second lens are in one of a partially overlapping and a non-overlapping spatial relationship;
   in response to separating the first lens and the second lens, simultaneously preserve the first circumscribed region of the geospatial map within each of the first and second lenses, and conceal a second non-circumscribed region; and
   display the first dataset within the first lens and the second dataset within the second lens.

2. The data processing system of claim 1, further comprising instructions that cause the processor to:
in response to receiving, at the first lens, a second action associated with the at least one second context, activate the at least one second context within the graphical overlay;
in response to activating the at least one second context, obtain a second dataset corresponding to the at least one second context from the at least one of the plurality of data sources; and
simultaneously display the second dataset throughout the entire graphical overlay and the first dataset within the first lens, wherein the displayed second dataset is a visual representation of a second context dataset obtained from the at least one of the plurality of data sources.

3. The data processing system of claim 1, further comprising instructions that cause the processor to:
orient the first lens in a first position, wherein the first dataset corresponds to the first position;
rotate the first lens around an axis of rotation until the first lens is oriented in a second position;
in response to rotating the first lens around the axis of rotation, reconfigure the first dataset to provide a modified first dataset; and
display the modified first dataset within the first lens, wherein the modified first dataset corresponds to the second position.

4. The data processing system of claim 3, further comprising instructions that cause the processor to:
associate a rotational position of the first lens with specific points in time, wherein the first position corresponds to a first point in time and the first dataset represents the first dataset at the first point in time;
in response to rotating the first lens in a first direction around the axis of rotation, to a second position that corresponds to a second point in time occurring after the first point in time, display a corresponding later-in-time version of the first dataset within the first lens, wherein the later-in-time version of the set of first dataset corresponding to the second position includes projected data; and
in response to rotating the first lens in a second direction around the axis of rotation, to a second position that corresponds to a second point in time occurring before the first point in time, display a corresponding earlier-in-time version of the first dataset within the first lens, wherein the earlier-in-time version of the first dataset corresponding to the second position includes historical data.

5. The data processing system of claim 1, wherein the first action comprises at least one of: rotation of a lens, activation of a lens, translation of a lens across the graphical overlay, and selection of the at least one interactive icon within a lens.

6. The data processing system of claim 1, further comprising instructions that cause the processor to:
in response to activating the first lens, activate a default context within the first lens.

7. The data processing system of claim 1, wherein the at least one first context is associated with a first domain including a network selected from a group comprising: a water network; a sewer network; an energy network; a public safety network; an emergency management network; a social services network; and a transportation network.

8. The data processing system of claim 2, wherein the at least one second context is associated with a second domain including a network selected from a group comprising: a water network; a sewer network; an energy network; a public safety network; an emergency management network; a social services network; and a transportation network.

9. The data processing system of claim 1, wherein the geospatial map includes a plurality of city streets.

10. A computer program product comprising:
a computer readable storage device; and
program code on the computer readable storage device that when executed within a data processing device, enables the data processing device to provide the functionality of:
displaying a graphical overlay on a spatial rendering of data;
overlaying a first lens on a first region of the graphical overlay, wherein the first lens includes at least one first context that is accessible by manipulation of the first lens and at least one interactive icon associated with the at least one first context;
in response to receiving, at the at least one interactive icon, a first action associated with the at least one first context, activating the at least one first context within the first lens;
in response to activating the at least one first context within the first lens, obtaining a first dataset corresponding to the at least one first context from at least one of a plurality of data sources;
displaying the first dataset within the first lens, wherein the displayed first dataset is a visual representation of a first context dataset obtained from the at least one of the plurality of data sources;
overlaying a second lens on a second region of the graphical overlay, wherein the second lens includes at least one second context that is accessible by manipulation of the second lens;
in response to receiving, at the first lens, a second action associated with the at least one second context, activating the at least one second context within the second lens;
in response to activating the at least one second context within the second lens, obtaining a second dataset corresponding to the at least one second context from the at least one of the plurality of data sources;
simultaneously displaying the second dataset within the second lens, while displaying the first dataset within the first lens, wherein the displayed second dataset is a visual representation of a second context dataset obtained from the at least one of the plurality of data sources;
circumscribing a first region of the graphical overlay within each of the first lens and the second lens, wherein the graphical overlay comprises a geospatial map;
separating the first lens and the second lens, wherein the first lens and the second lens are in one of a partially overlapping and a non-overlapping spatial relationship;
in response to separating the first lens and the second lens, simultaneously preserving the first circumscribed region of the geospatial map within each of the first and second lenses, and conceal a second non-circumscribed region; and
displaying the first dataset within the first lens and the second dataset within the second lens.

11. The computer program product of claim 10, wherein the program code further comprises program code that enables the data processing device to provide the functionality of:

orienting the first lens in a first position, wherein the first dataset corresponds to the first position;

rotating the first lens around an axis of rotation until the first lens is oriented in a second position;

in response to rotating the first lens around the axis of rotation, reconfiguring the first dataset to provide a modified first dataset;

displaying the modified first dataset within the first lens, wherein the modified first dataset corresponds to the second position; and in response to the first lens being oriented m the second position, simultaneously displaying the modified first dataset corresponding to the second position and a ghosted image of the first dataset corresponding to the first position.

12. The computer program product of claim 10, wherein the program code further comprises program code that enables the data processing device to provide the functionality of:

in response to simultaneously displaying the visual representations of the first and second context datasets, and while the first and second lenses are in one of a partially overlapping and a fully overlapping relation, determining a correlation between the first and second datasets according to at least one method of determination selected from one of an inference engine determination and a determination according to a set of rules.

13. The computer program product of claim 10, wherein the first action comprises at least one of: rotation of a lens, activation of a lens, translation of a lens across the graphical overlay, and selection of the at least one interactive icon within a lens.

14. The computer program product of claim 10, wherein the program code further comprises program code that enables the data processing device to provide the functionality of:

in response to activating the first lens, activating a default context within the first lens.

15. The computer program product of claim 10, wherein:

the at least one first context is associated with a first domain comprising a network selected from a group including: a water network; a sewer network; an energy network; a public safety network; an emergency management network; a social services network; and a transportation network; and the at least one second context is associated with a second domain comprising a network selected from a group including: a water network; a sewer network; an energy network; a public safety network; an emergency management network; a social services network; and a transportation network.

16. The computer program product of claim 10, wherein the geospatial map includes a plurality of city streets.

* * * * *